(12) United States Patent
Liu et al.

(10) Patent No.: US 6,504,541 B1
(45) Date of Patent: Jan. 7, 2003

(54) WARPING GEOMETRIC OBJECTS

(75) Inventors: Hongche Liu; Shyam Kuttikkad, both of Fremont, CA (US)

(73) Assignee: Tele Atlas North America, Inc., Menlo Park, CA (US)

( * ) Notice: Subject to any disclaimer, the term of this patent is extended or adjusted under 35 U.S.C. 154(b) by 0 days.

(21) Appl. No.: 09/176,522

(22) Filed: Oct. 21, 1998

(51) Int. Cl.[7] .............................................. G06T 11/00
(52) U.S. Cl. ........................ 345/433; 345/473; 382/294
(58) Field of Search ................................ 345/433, 442, 345/419, 473, 418, 423, 474, 475, 127; 382/294, 154, 284, 173, 295, 297, 296, 298; 716/20

(56) References Cited

U.S. PATENT DOCUMENTS

| | | | | |
|---|---|---|---|---|
| 4,805,127 A | | 2/1989 | Hata et al. ................... | 345/441 |
| 4,912,664 A | * | 3/1990 | Weiss et al. .................. | 716/20 |
| 5,465,323 A | * | 11/1995 | Mallet ......................... | 345/423 |
| 5,486,822 A | | 1/1996 | Tenmoku et al. ........... | 340/995 |
| 5,546,107 A | | 8/1996 | Deretsky et al. .......... | 707/104.1 |
| 5,845,228 A | | 12/1998 | Uekawa et al. ............. | 701/209 |
| 5,850,229 A | * | 12/1998 | Edelsbrunner et al. ...... | 345/473 |
| 5,864,342 A | * | 1/1999 | Kajiya et al. ............... | 345/418 |
| 5,878,164 A | | 3/1999 | Brown et al. ............... | 382/190 |
| 6,026,189 A | | 2/2000 | Greenspan et al. ......... | 382/226 |
| 6,078,701 A | * | 6/2000 | Hsu et al. ................... | 382/294 |

OTHER PUBLICATIONS

Marshall Bern and David Epstein, *Mesh Generation and Optimal Triangulation*, Computing and Euclidean Geometry, Ding–Zhu Du and Frank Hwang editors, World Scientific, Singapore, pp. 23–90, 1992.

Jonathan Richard Shewchuk, *Triangle: Engineering a 2D Quality Mesh Generator and Delaunay Triangulator*, First Workshop on Applied computational Geometry (Philadelphia, Pennsylvania) pp. 124–133, ACM, May 1996.

Jim Ruppert, *A Delaunay Refinement Algorithm for Quality 2–Dimensional Mesh Generation*, Journal of Algorithms 18(3):548–585, May 1995.

Marshall Bern and David Epstein, *Mesh Generation and Optimal Triangulation*, Computing and Euclidean Geometry, Ding–Zhu Du and Frank Hwang editors, World Scientific, Singapore, pp. 1–78, 1992.

Jonathan Richard Shewchuk, *Triangle: Engineering A 2D Quality Mesh Generator and Delaunay Triangulator*, First Workshop on Applied Computational Geometry (Philadelphia, Pennsylvania), pp. 1–10, ACM, May 1996.

(List continued on next page.)

*Primary Examiner*—Jeffery Brier
*Assistant Examiner*—Thu-Thao Havan
(74) *Attorney, Agent, or Firm*—Fliesler, Dubb, Meyer & Lovejoy LLP

(57) ABSTRACT

A system is disclosed for warping models made from geometric objects, such as electronic maps, to correct local distortions in the models without compromising model topology. A set of transformation functions are derived from relationships between points in a first model that match points in a second model. The transformation functions are then applied to the points in the first model to generate a new model with reduced distortion. In order to provide for reducing local distortions, warping is applied to selected corresponding regions of the first model and the second model by triangulating these regions and generating transformation functions for each corresponding pair of triangles. Topology preservation is achieved by identifying matching points in the first model and the second model that have a potential for causing topology deviations. Such matching points are then excluded from the process of developing transformation equations to be used in the warping process. Matching points with potential for causing topology deviations are identified by triangulating matching points in the selected regions of the first model and the second model and analyzing the resulting triangles.

42 Claims, 17 Drawing Sheets

OTHER PUBLICATIONS

Jim Ruppert, *A Delauney Refinement Algorithm for Quality 2–Dimensional Mesh Generation*, Journal of Algorithms, Journal of Algorithms 18(3): 1–46, May 1995.

Zhu et al., *FORMS: A flexible Object Recognition and Modelling System*, IEEE Paper ISBN: 0–8186–7042–8, pp. 465–472, Jun. 1995.

Cakmakov et al, *A Model for Polygon Similarity Estimation*, IEEE Paper ISBN: 0–8186–2760–3, pp. 701–705, May 1992.

Lu et al., *M5.11: Hierarchical Shape Recognition Using Polygon Approximation and Dynamic Alignment*, IEEE Paper CH2561–9, vol. 2, pp. 976–979, Apr. 1988.

Shum et al, *On 3D Shape Similarity*, IEEE Paper ISBN: 0–8186–7258–7, pp. 526–531, Jun. 1996.

Jonathan Shewchuk, *Triangle: A Two–Dimensional Quality Mesh Generator and Delaunay Triangulator*, www.cs.cmu.edu/~quake/triangle.html, p. 1–2, Oct. 15, 1998.

Jonathan Shewchuk, *Research credit, references, and online papers*, www.cs.cmu.edu/~quake/triangle.research.html, pp. 1–3, Oct. 15, 1998.

Shewchuk et al., *Archimedes*, www.cs.cmu.edu/~quake/archimedes.html, pp. 1–4, Mar., 1998.

Jonathan Shewchuk, *Adaptive Precision Floating–Point Arithmetic and Fast Robust Predicates for Computational Geometry*, www.cs.cmu.edu/~quake/robust.html, pp. 1–4, Oct. 15, 1998.

Jonathan Shewchuk, *Triangle: Engineering a 2D Quality Mesh Generator and Delaunay Triangulator*, www.cs.cmu.edu/~quake/tripaper/triangle0.html, pp. 1, Aug. 12, 1996.

Jonathan Shewchuk, *A demonstration of Triangle*, www.cs.cmu.edu/~quake/triangle.demo.html, pp. 1–4, Oct. 15, 1998.

Jonathan Shewchuk, *Definitions (of several geometric terms)*, www.cs.cmu.edu/~quake/triangle.defs.html#dt, pp. 1–4, Oct. 15, 1998.

Jonathan Shewchuk, *Triangle's speed*, www.cs.cmu.edu/~quake/triangle.time.html, p. 1, Oct. 15, 1998.

Jonathan Shewchuk, *Command line switches*, www.cs.cmu.edu/~quake/triangle.switch.html, pp. 1–2, Oct. 15, 1998.

Jonathan Shewchuk, *Generating Dealaunay triangulations*, www.cs.cmu.edu/~quake/triangle.delaunay.html, pp. 1–2, Oct. 15, 1998.

Jonathan Shewchuk, *Quality meshing: angle and area constraints*, www.cs.cmu.edu/~quake/triangle.quality.html, pp. 1–3, Oct. 15, 1998.

Jonathan Shewchuk, *Refining preexisting meshes*, www.cs.cmu.edu/~quake/triangle.refine.html, pp. 1–3, Oct. 15, 1998.

Jonathan Shewchuk, *Convex hulls and mesh boundaries*, www.cs.cmu.edu/~quake/triangle.convex.html, pp. 1–2, Oct. 15, 1998.

Jonathan Shewchuk, *Voronoi diagrams*, www.cs.cmu.edu/~quake/triangle.voronoi.html, p. 1, Oct. 15, 1998.

Jonathan Shewchuk, *node files*, www.cs.cmu.edu/~quake/triangle.node.html, p. 1, Oct. 15, 1998.

Jonathan Shewchuk, *.ele files*, www.cs.cmu.edu/~quake/triangle.ele.html, p. 1, Oct. 15, 1998.

Jonathan Shewchuk, *.poly files*, www.cs.cmu.edu/~quake/triangle.poly.html, pp. 1–2, Oct. 15, 1998.

Jonathan Shewchuk, *.area files*, www.cs.cmu.edu/~quake/triangle.area.html, p. 1, Oct. 15, 1998.

Jonathan Shewchuk, *edge files*, www.cs.cmu.edu/~quake/triangle.edge.html, p. 1, Oct. 15, 1998.

Jonathan Shewchuk, *.neigh files*, www.cs.cmu.edu/~quake/triangle.neigh.html, p. 1, Oct. 15, 1998.

Jonathan Shewchuk, *Mesh iteration numbers*, www.cs.cmu.edu/~quake/triangle.iteration.html, p. 1, Oct. 15, 1998.

Jonathan Shewchuk, *Exact arithmetic*, www.cs.cmu.edu/~quake/triangle.exact.html, p. 1, Oct. 15, 1998.

Jonathan Shewchuk, *Quadratic elements*, www.cs.cmu.edu/~quake/triangle.highorder.html, p. 1, Oct. 15, 1998.

Jonathan Shewchuk, *Statistics*, www.cs.cmu.edu/~quake/triangle.stats.html, pp. 1–2, Oct. 15, 1998.

Jonathan Shewchuk, *Troubleshooting*, www.cs.cmu.edu/~quake/triangle.trouble.html, pp. 1–2, Oct. 15, 1998.

\* cited by examiner

WARPING GEOMETRIC OBJECTS

CROSS-REFERENCES TO RELATED APPLICATIONS

This Application is related to the following Application:

Matching Geometric Objects, by Hongche Liu and Shyam Kuttikkad, Ser. No. 09/176,243, filed Oct. 21, 1998.

The above-cited Application is incorporated herein by reference.

BACKGROUND OF THE INVENTION

1. Field of Invention

The present invention is directed toward the field of warping sets of geometric objects.

2. Description of Related Art

Physical areas are often modeled using geometric objects. Examples of such physical areas include a geographic region and a building's floor plan. One example of a model using two-dimensional geometric objects is a map of a geographic region, such as a city.

FIG. 1 illustrates a map that is formed by a set of geometric objects. The objects in FIG. 1 include points 60–70, arcs 80–91, and polygons 50–51. Each arc 80–91 represents a road and is bounded at each of its ends by a point. For example, arc 80 is bounded at one end by point 60 and at another end by point 62. Each arc can be co-bounded by one or two polygons. For example, arc 86 is co-bounded by polygons 50 and 51, while arc 85 is only co-bounded by polygon 50. Each polygon 50 and 51 is formed by a set of arcs that define the boundary of the polygon. For example, polygon 50 is defined by boundary arcs 81, 82, 83, 84, 85, and 86.

Different models of the same physical area often provide different quality details about the area. Differences between models of the same area can occur, because models can be distorted, so that all the features in the model are not depicted in their true positions. Such distortions are often localized, with different regions of the model being distorted differently. In paper models, distortion can be caused by paper stretching, folding, and scaling. In electronic models, distortion can be caused when the model is transformed into digital form.

By repositioning different models of the same area, a more accurate new model can be created. FIG. 2 illustrates a map 100 of an area that is neither very smooth nor accurate. FIG. 3 shows a more accurate map 10 of the same area as map 100. The differences between maps 100 and 10 are illustrated in FIG. 4, which shows an overlay of maps 100 and 110. A repositioning process can be performed to utilize the details of both maps 100 and 110 to obtain an improved new map.

The use of repositioning is particularly beneficial and practical is generating electronic maps. There are often many different maps available for a particular region. By making use of a computer to reposition the many maps that are available for a region, a very accurate new map can be generated in a time efficient and cost efficient manner.

One known method for repositioning two models is to warp one model based on the weighted sum of local displacements between points in the two models. In this method, a set of matching points in the models is obtained for selected regions of the models. Displacements between matching points in each selected region are then employed to generate a warping transformation for the selected region. The warping transformation is then used to transform points in one of the models into points in a new model.

However, such a method is inadequate, because it does not provide for maintaining the topology of the original models in the new model. Topology refers to the relative connections and orientations of geometric objects in the model, and its preservation is critical to ensuring the accuracy of the new model. For example, if topology is not preserved, arc intersections which do not exist in either of the original models may be inserted into the new model.

In order to better maintain topology, model-based warping can be employed. One known method of such warping includes the creation of a global transformation model that provides for transforming all of the points in a model into points in a new model. In such a method, all matching points from two existing models are employed to determine parameters for the global transformation model using numerical analysis, such as least mean squares techniques. However, this global approach does not provide for eliminating local distortions, which constitute many of the distortions that are encountered.

Accordingly, there is a need for a warping process that can be applied to models to correct local distortions without compromising topology.

SUMMARY OF THE INVENTION

The present invention, roughly described, provides for warping models made from geometric objects, such as electronic maps, to correct local distortions in the models without compromising model topology. The warping is performed by using a set of transformation functions that are derived from relationships between points in a first model that match points in a second model with more accurate positioning. The transformation functions are applied to the points in the first model to generate a new model with reduced distortion.

In order to provide for reducing local distortions, warping is applied to selected corresponding regions of the first model and the second model by triangulating these regions and generating transformation functions for each corresponding pair of triangles. Topology preservation is achieved by identifying matching points in the first model and the second model that have a potential for causing topology deviations. Such matching points are then excluded from the process of developing transformation equations to be used in the warping process.

Matching points with potential for causing topology deviations are identified by triangulating matching points in the selected regions of the first model and the second model and analyzing the resulting triangles. A matching point is identified as having potential for causing topology deviations, if it is a vertex in a triangle in one model that has an inverted corresponding triangle in the other model. A matching point is also identified as having potential for causing topology deviations, if it is a vertex in a triangle having too small an area or height. An iterative process is performed to identify such undesirable matching points.

These and other objects and advantages of the present invention will appear more clearly from the following description in which the preferred embodiment of the present invention has been set forth in conjunction with the drawings.

BRIEF DESCRIPTIONS OF THE DRAWINGS

The present invention will be described with reference to the following drawings, in which.

Figure 17A:
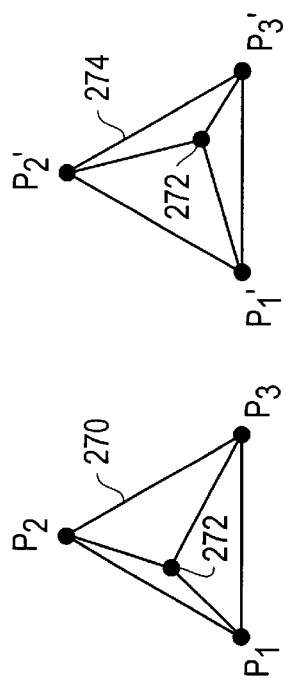
Figure 17B:
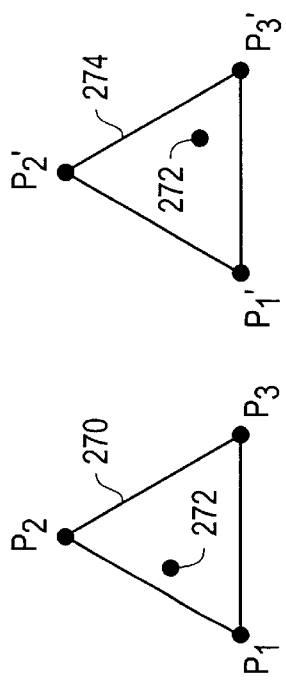

FIGS. 17(a)–(b) illustrate the successful replacement of a matching point in one embodiment of the present invention.

Figure 18A:
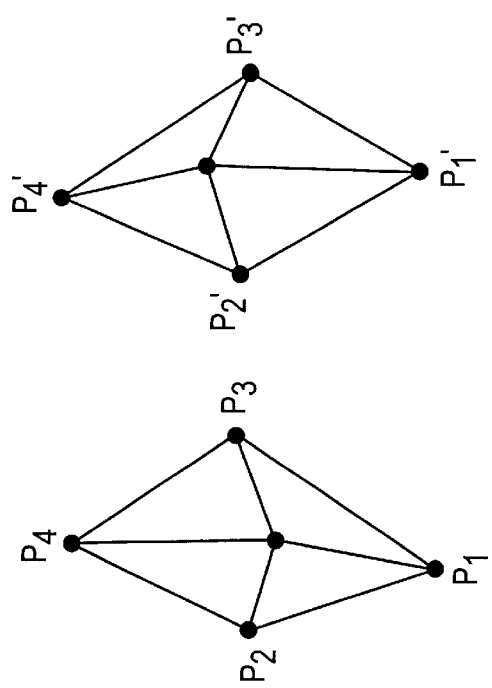
Figure 18B:
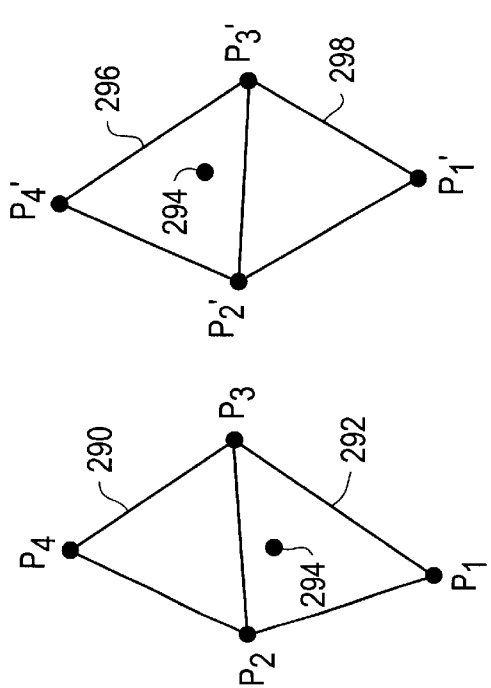

FIGS. 18(a)–(b) illustrate the successful replacement of a matching point in an alternate embodiment of the present invention.

Figure 19:
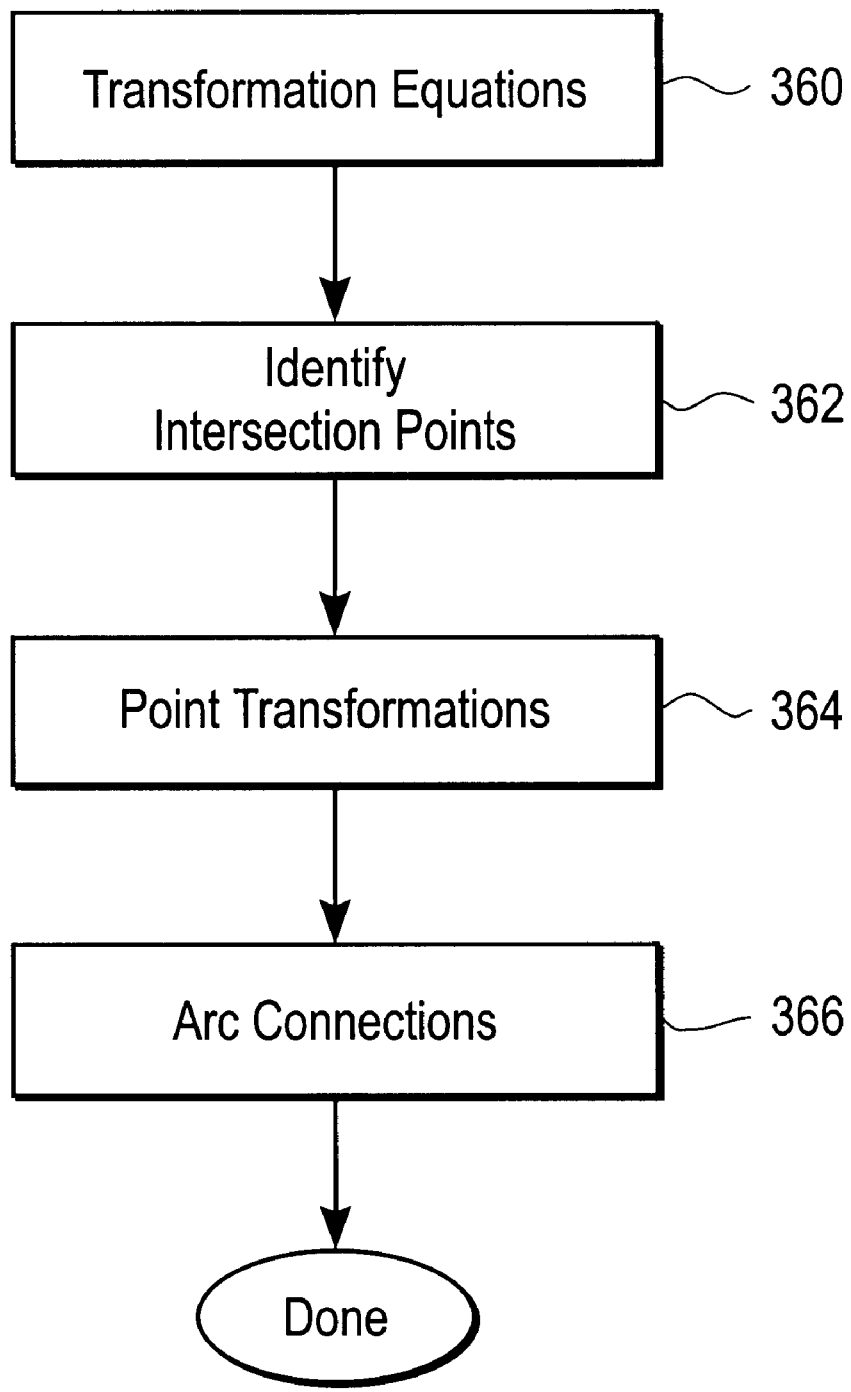

FIG. 19 illustrates a sequence of operations for transforming selected regions of a model.

Figure 20C:
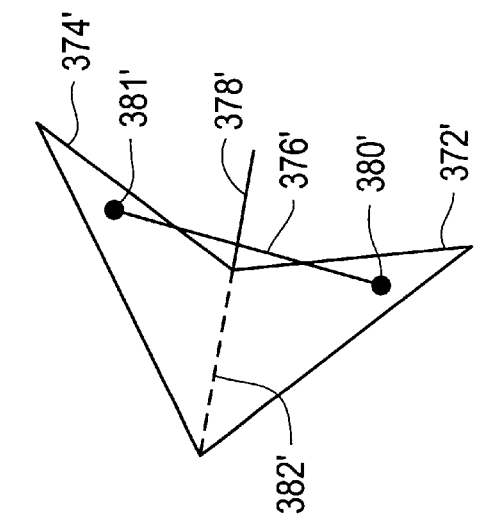
Figure 20B:
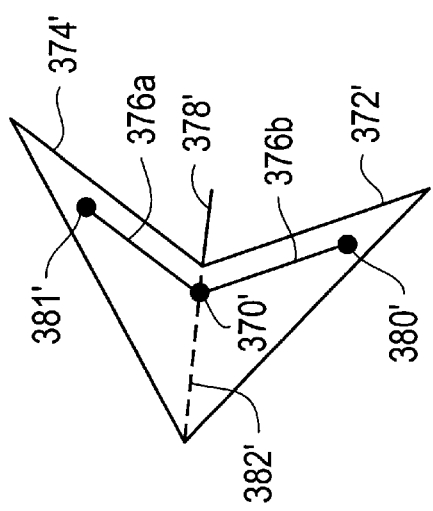
Figure 20A:
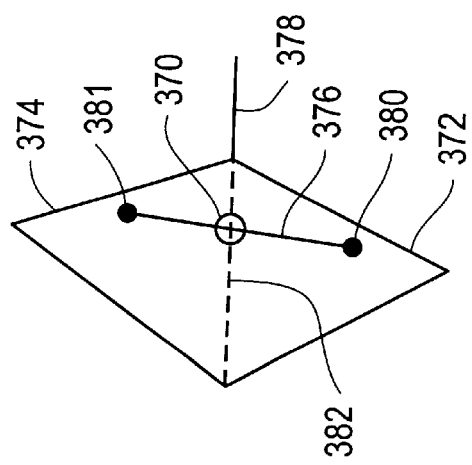

FIGS. 20(a)–(c) illustrate intersection points.

Figure 21:
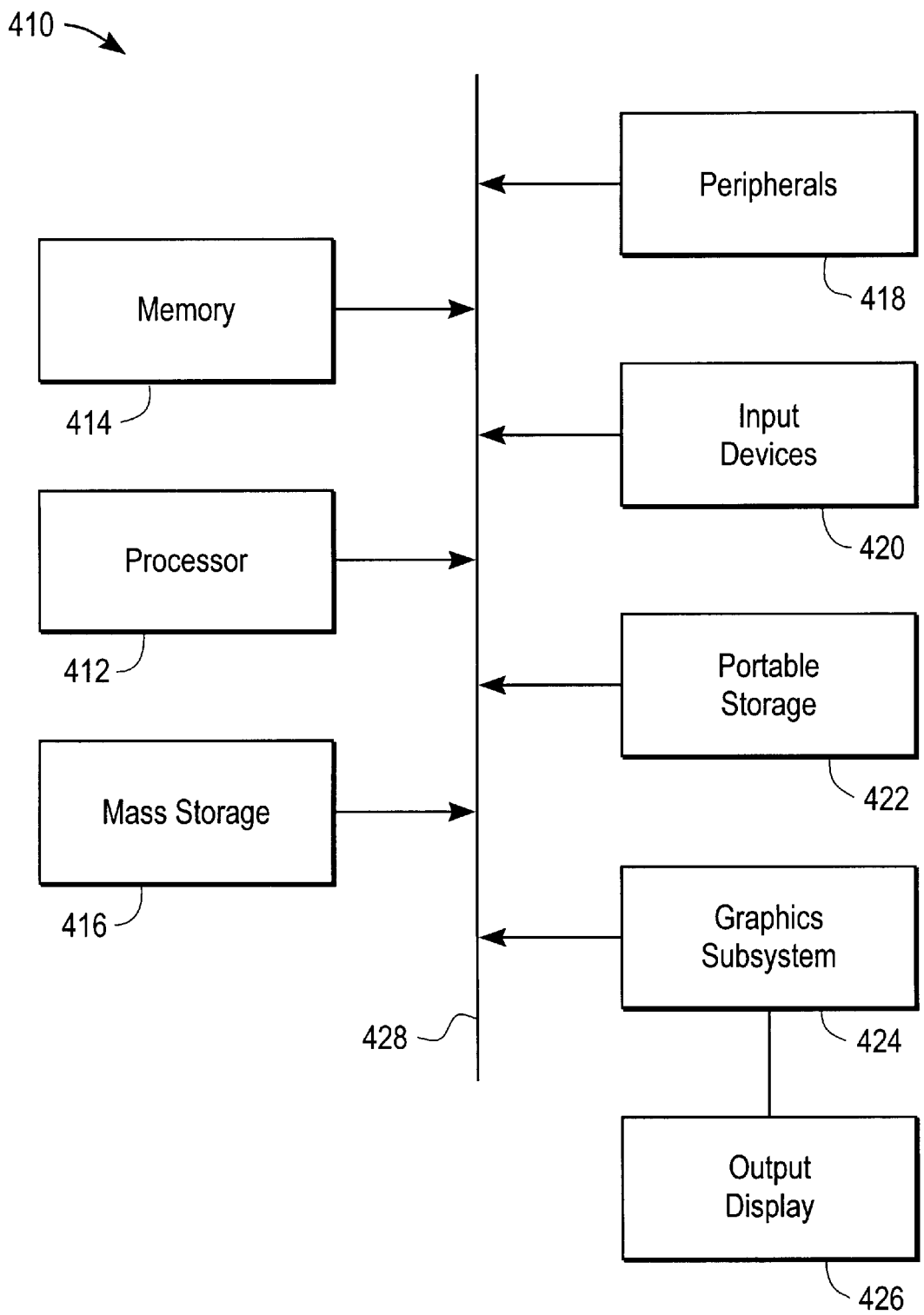

FIG. 21 illustrates a block diagram of one exemplar hardware architecture that can be used to practice the present invention.

DETAILED DESCRIPTION

Figure 1:
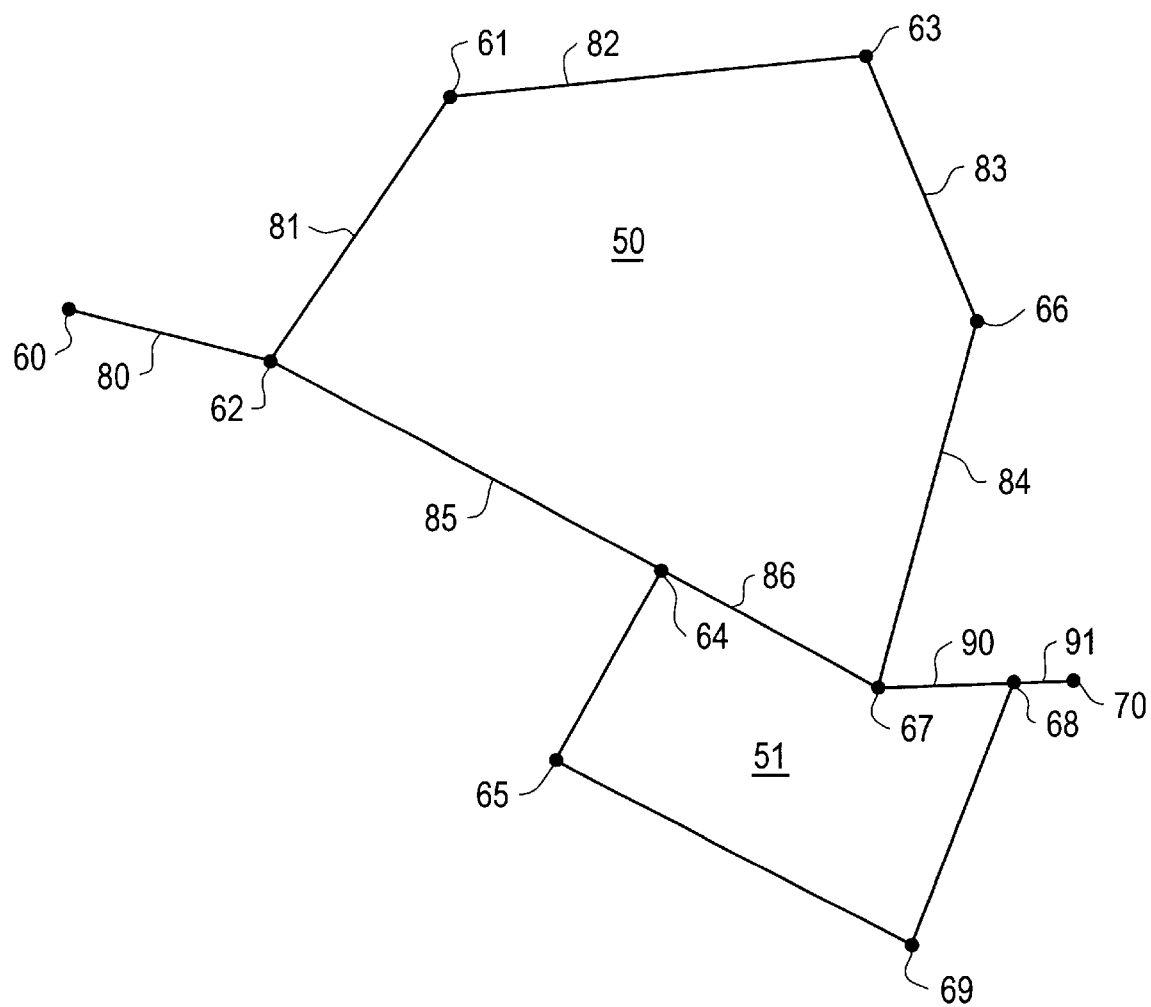
FIG. 1 illustrates a model using geometric objects.
Figure 2:
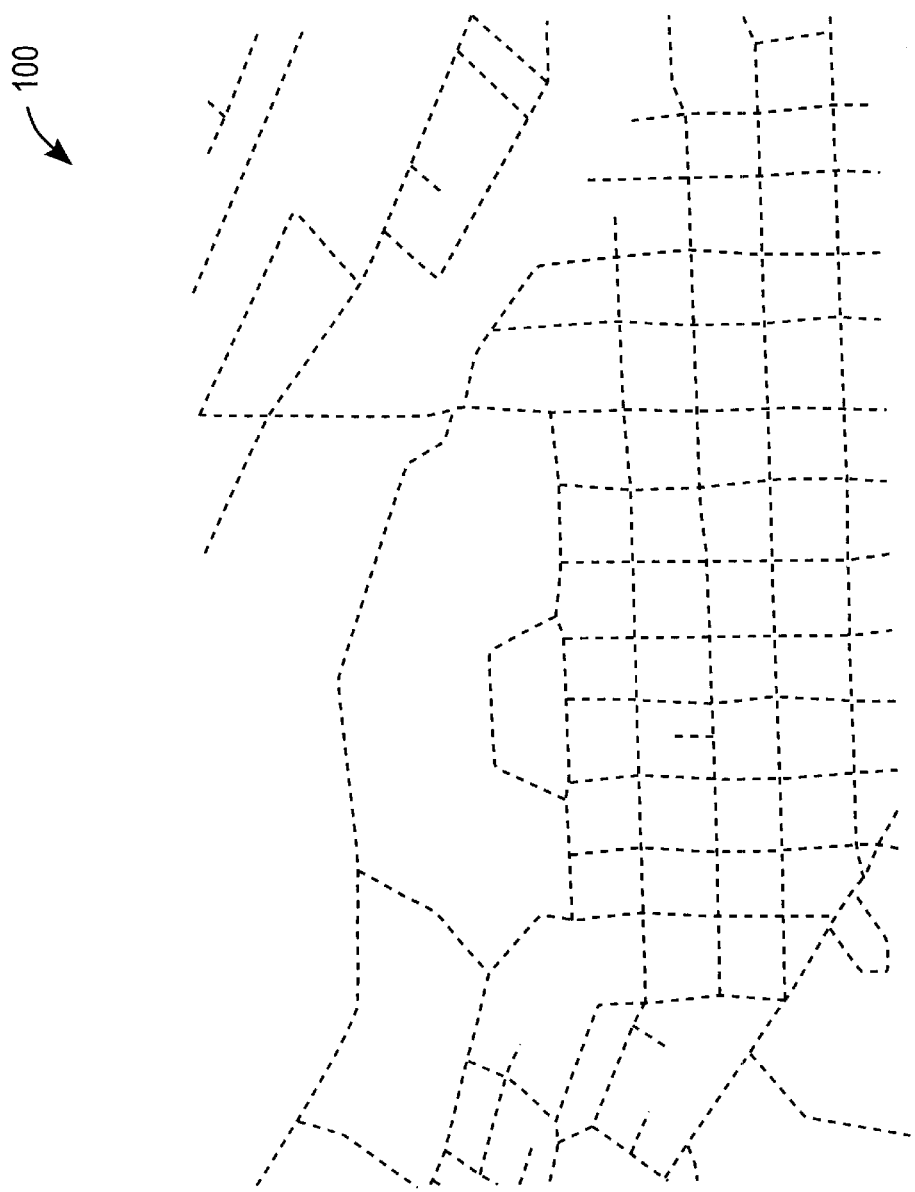
FIG. 2 is a first map of an area.
Figure 3:
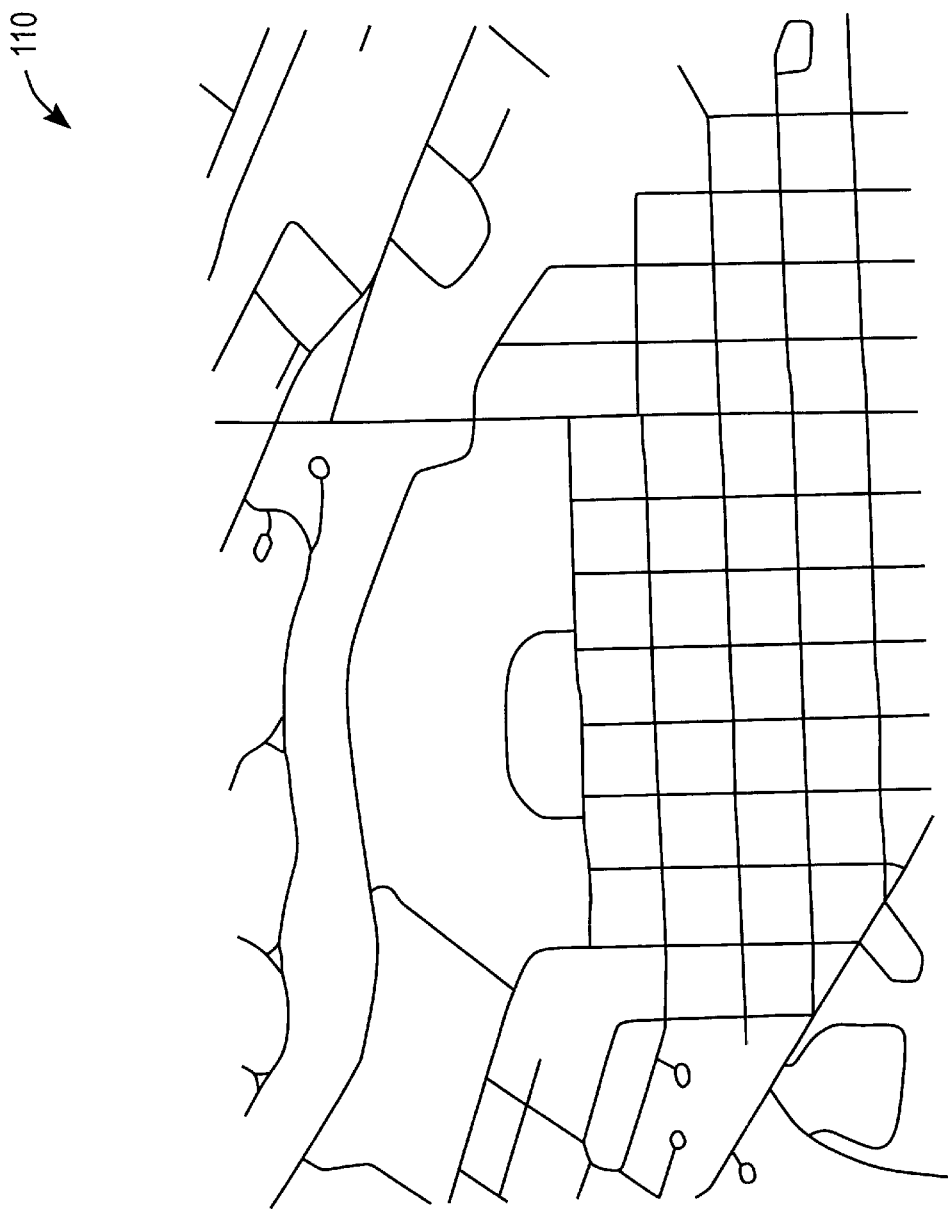
FIG. 3 is a second map of the area shown in FIG. 2.
Figure 4:
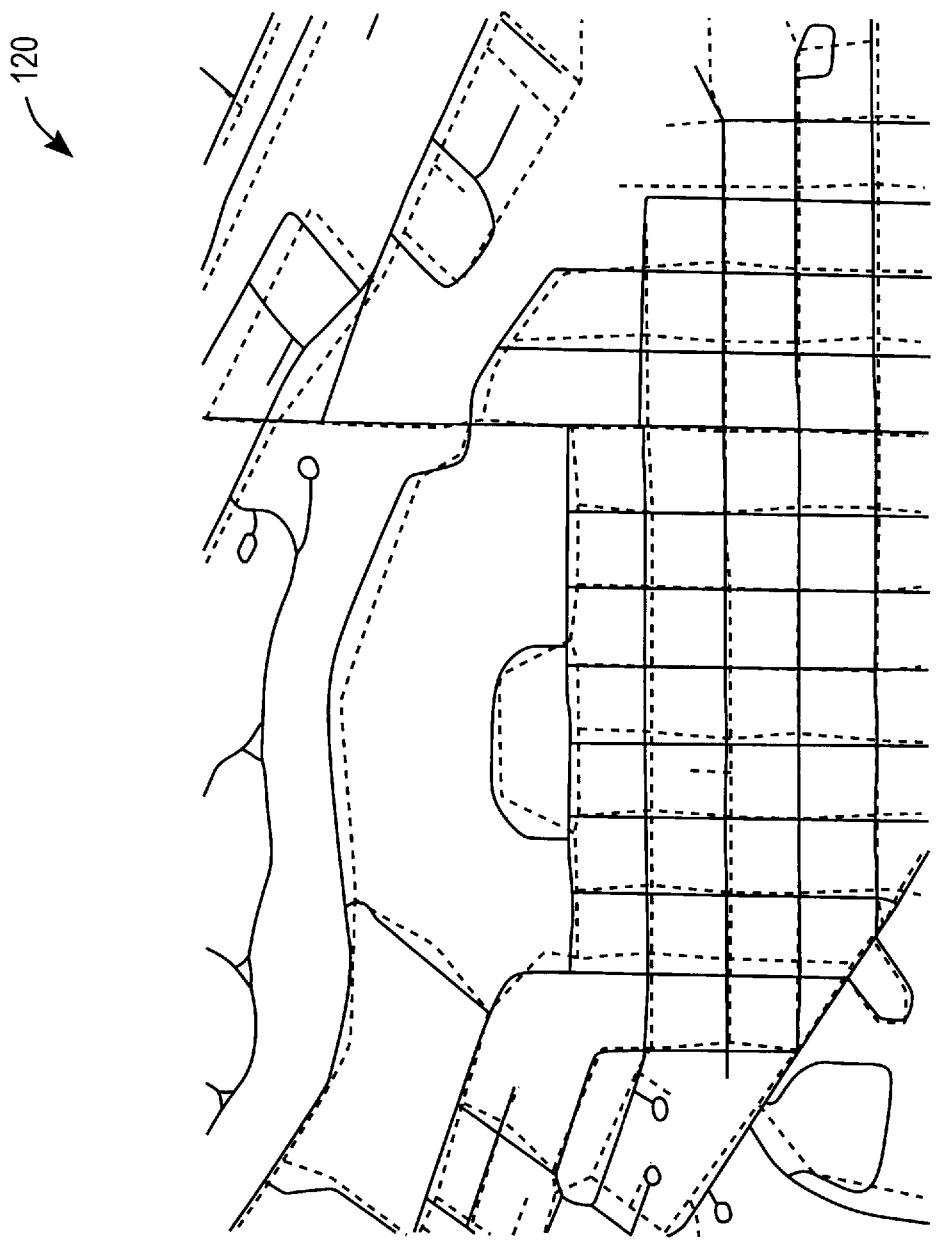
FIG. 4 depicts the map in FIG. 2 being overlaid by the map in FIG. 3.
Figure 5:
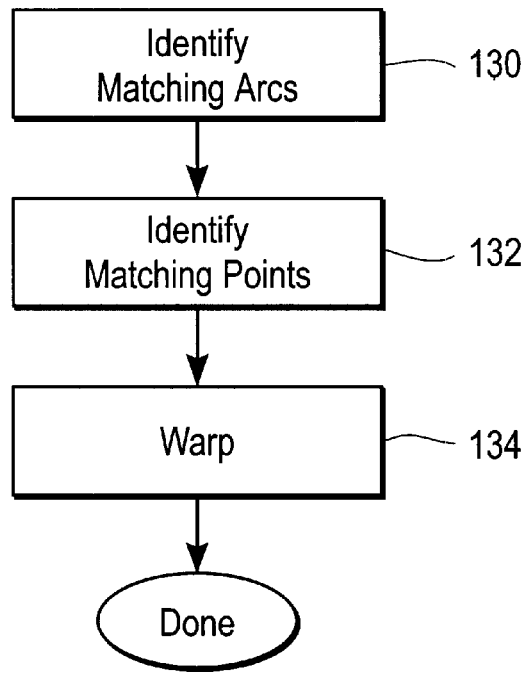
FIG. 5 illustrates a sequence of operations for repositioning one model to another.

FIG. 5 illustrates a sequence of operations for performing a repositioning of two sets of geometric objects, in accordance with the present invention. In one embodiment of the present invention, each set of geometric objects is an electronic map. In such an embodiment, the repositioning process is carried out by a computer system which is able to access both of the electronic maps and a set of instructions that provides for repositioning the two electronic maps. Such a computer system will be described in greater detail below.

In describing aspects of the present invention, maps, and in particular electronic maps, will be used as an example of a set of geometric objects. However, one with ordinary skill in the art will recognize that a set of geometric objects can be used to represent a number of other things, such as the floor plan of a building, a layout of an integrated circuit, and a machine drawing. Accordingly, the invention is in no way limited to electronic maps and can be practiced using any set of geometric objects.

As shown in FIG. 5, repositioning is initiated in step 130 by identifying arcs in a first electronic map (first set of geometric objects) for which there is a matching arc in a second electronic map (second set of geometric objects). The matching arcs are then employed in step 132 to identify points in the first map that match points in the second map in step 132. Next, geometric objects in the first map are warped to create a new map, based on a transformation function that is derived from a set of the matching points identified in step 132.

In embodiments of the present invention, the arc matching performed in step 130 is based on geometry and topology information associated with the maps. This avoids any reliance on arc attributes, which may not be supplied. In general, arc matching is performed by identifying arcs in the first map that are co-bounded on both sides by polygons which match the corresponding co-bounding polygons of the arc in the second map.

In order to identify matching polygons, a set of similarity metrics are determined for each pairing of a polygon in the first map and a polygon in the second map. The similarity metrics are then employed to determine the degree of similarity between polygons and whether or not they match. In one embodiment of the present invention, the similarity metrics include isolated metrics that indicate the similarity of the shape, proximity, area, and rotation of polygons being compared.

The identification of matching points in step 132 is based on the matching arcs identified in step 130 and can be performed in a number of ways that are well known in the art. One such process for identifying matching points is disclosed in U.S. Pat. No. 5,546,107, entitled Automatic Chain-Based Conflation of Digital Maps. However, many other processes can be employed.

In accordance with the present invention, the warping of the first map in step 134 is performed so that local distortions in the first and second maps are removed without compromising the topology represented in the two maps. In one embodiment of the present invention, selected corresponding regions of each map are employed in the warping process. For the selected regions, it is determined which matching points have potential for causing topology deviations to occur in the new map being created. These points are regarded as outliers and are rejected from the set of matching points. Transformation equations are then derived using the remaining matching points. Finally, the transformation equations are used to transform points in the first map to generate the new map.

In order to perform the repositioning process described in FIG. 5, several requirements must be met. The positions and shapes of all geometric objects (points, arcs, and polygons) must be provided with respect to a common coordinate system. The origin for each coordinate system is to represent the same physical location. All topological information relating to the maps must also be provided. Such information includes the points bounding each arc, the arcs defining each polygon, the arcs connected to each point, and the polygons co-bounding each arc.

When warping, it is also critical that the selected region of interest in each map represents the same physical location. This can be ensured by having the vertices for a selected region in the first map represent the same real world locations as the vertices for the selected region in the second map. The need for this requirement will be explained below.

Figure 6:
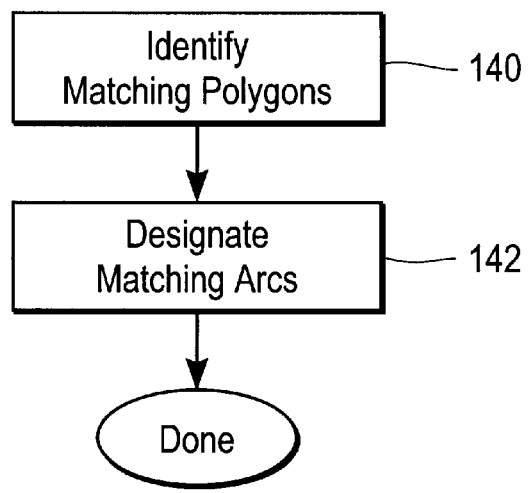
FIG. 6 illustrates a sequence of operations for identifying matching arcs in accordance with the present invention.

FIG. 6 illustrates a sequence of operations that are performed to identify matching arcs (step 130, FIG. 5) in the two selected maps. First, matching polygons in the two maps are identified in step 140. The matching polygons are then employed to designate matching arcs in step 142.

Figure 7:
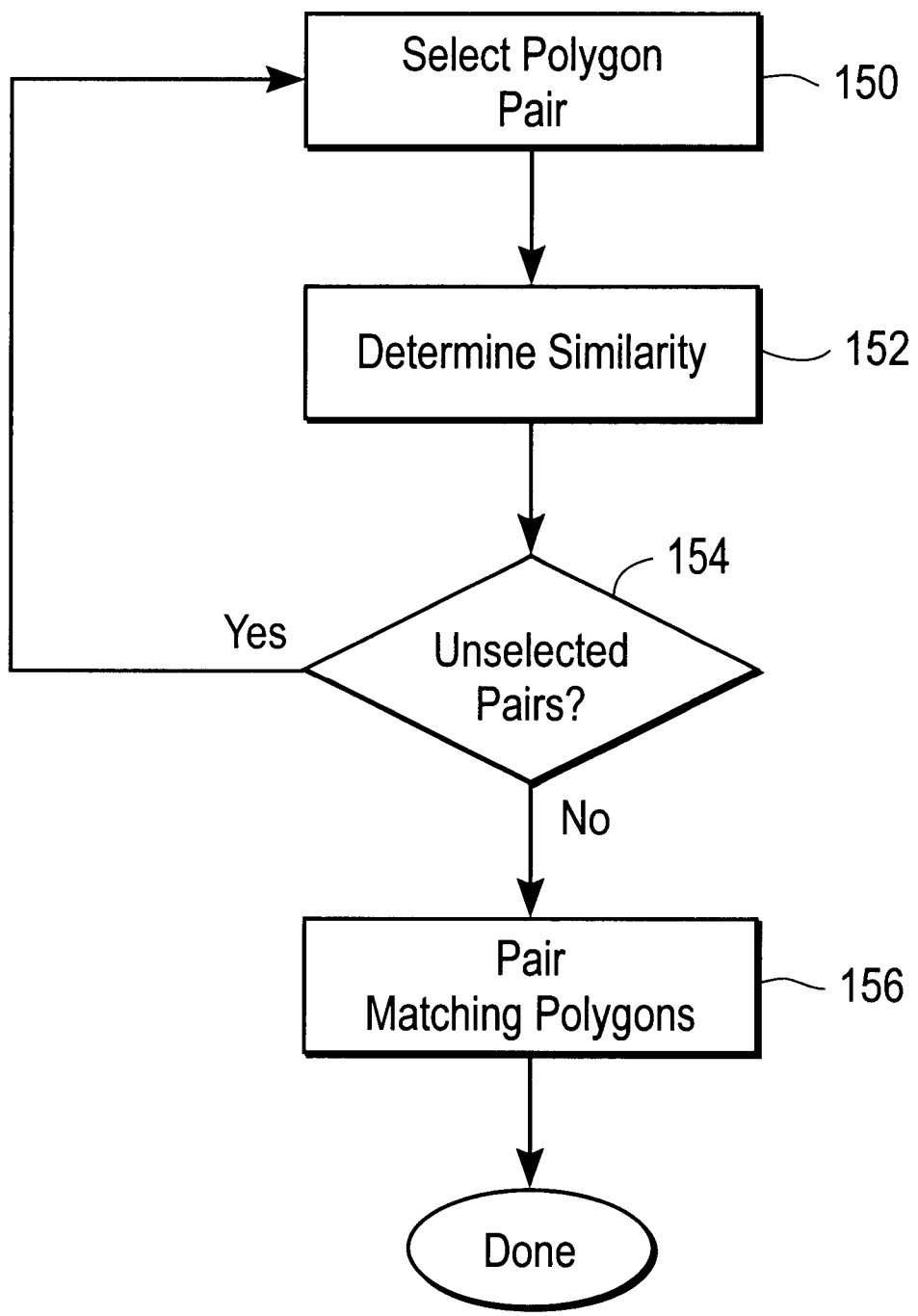
FIG. 7 illustrates a sequence of operations for identifying matching polygons.

FIG. 7 illustrates a sequence of operations employed in one embodiment of the present invention for identifying matching polygons in different maps (step 140, FIG. 6). First, a pair of polygons is selected in step 150, with one polygon being in the first map and the other polygon being in the second map. Next, the degree of similarity of the selected polygons is determined in step 152. Once the degree of similarity is determined, a determination is made of whether there are any unselected pairs of polygons in step 154. If it is determined that there is a pair of polygons that has not yet been selected, a new pair is selected in step 150 and the above described process is repeated. Otherwise, matching polygons are paired in step 156, based on the similarity determinations made in step 152.

Figure 8:
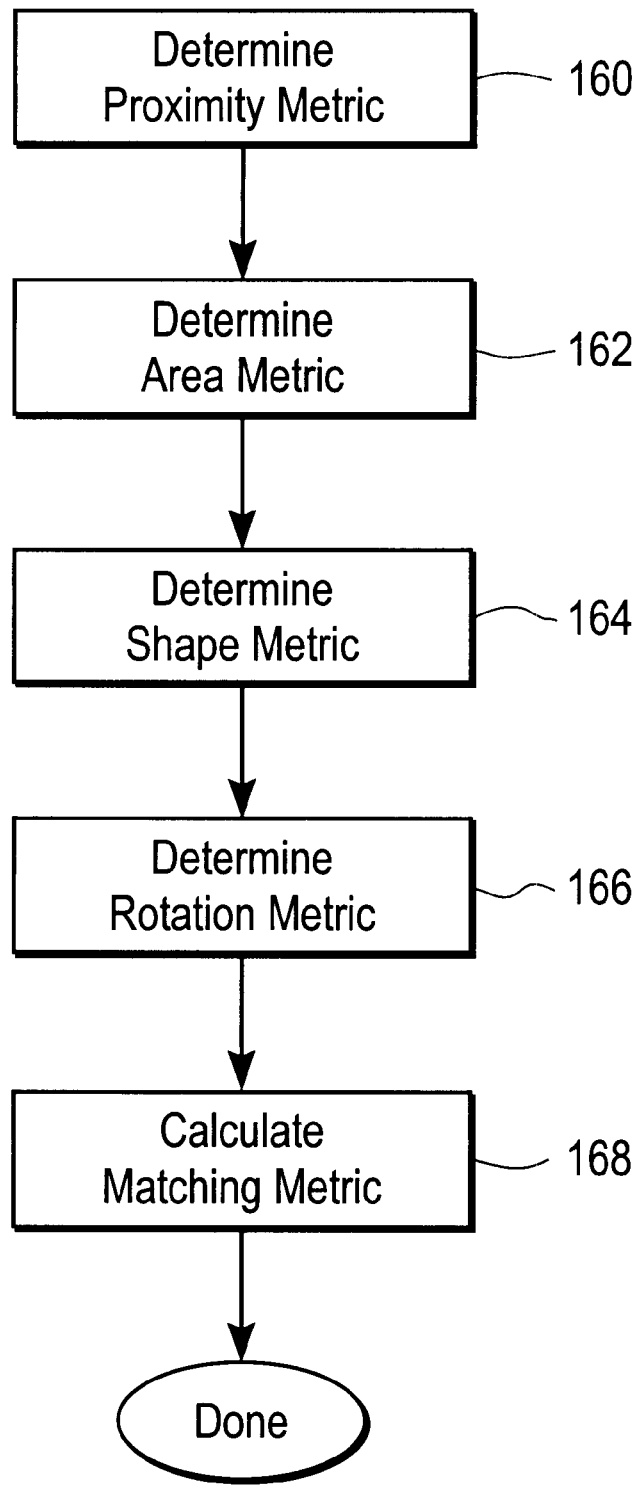
FIG. 8 illustrates a sequence of operations for determining the degree of similarity between a pair of polygons.

FIG. 8 illustrates a sequence of operations that is employed in one embodiment of the present invention for determining the degree of similarity between two polygons (step 152, FIG. 7). First, a set of similarity metrics for the selected pair of polygons is determined (steps 160, 162, 164, and 166). Next, the degree of similarity between the selected pair of polygons is calculated in step 168, based on the set of similarity metrics. As shown in FIG. 8, similarity metrics are obtained for the relative proximity, area, shape, and rotation of the selected polygons. However, in alternate embodiments of the present invention, other similarity metrics, or a subset of the similarity metrics shown in FIG. 8, or a combination thereof are included in the set of similarity metrics.

As shown in FIG. 8, a proximity similarity metric is first determined in step 160, independent of the area, shape, and rotation metrics. As a first step in determining the proximity, a centroid is computed for each polygon in the selected pair. In order to determine the centroid for a geometric object, N number of points are selected along the polygon's perimeter. In one embodiment of the present invention, the N number of points are selected with each of the selected points being separated by an equal distance along the polygon's perimeter. The coordinates of the centroid are then calculated according to the following equation:

$$C = \left( \frac{\sum_{i=1}^{N} x_i}{N}, \frac{\sum_{i=1}^{N} y_i}{N} \right) \quad \text{Equation 1}$$

wherein:

C is the x and y coordinates for the centroid;

$x_i$ is an x coordinate for the ith selected point on the polygon's perimeter; and $y_i$ is the y coordinate for the ith selected point on the polygon's perimeter.

Although the invention is described in terms of the Cartesian coordinate system (x, y), one with ordinary skill in the art will recognize that the use of other coordinate systems is within the scope of the present invention.

Once the centroid for each of the selected polygons has been determined, the displacement between the centroids is calculated according to the following equation:

$$D = \sqrt{(x_A - x_B)^2 + (y_A - y_B)^2} \quad \text{Equation 2}$$

wherein:

D is the displacement;

$x_A$ is the x coordinate for the centroid in the polygon from the first map;

$x_B$ is the x coordinate for the centroid in the polygon from the second map;

$y_A$ is the y coordinate for the centroid in the polygon from the first map; and $y_B$ is the y coordinate for the centroid in the polygon from the second map.

Once the displacement has been determined, the proximity similarity metric is calculated according to the following equation:

$$P = \frac{(B-D)}{(B+D)} \text{ if } B > D, \text{ else} \quad \text{Equation 3}$$
$$P = 0$$

wherein:

P is the proximity similarity metric; and

B is a normalizing constant.

In one embodiment of the present invention, N is equal to 32, and normalizing constant B is user selectable based on the quality of the maps being repositioned. In a typical example, the first map has a 1:24K scale, yielding an accuracy tolerance of 40 feet, and the second map has a 1:100K scale, yielding an accuracy tolerance of 160 feet. In such an example, normalizing constant B is equal to the sum of the tolerances of the two maps, which is equal to 200 feet.

Figure 9:
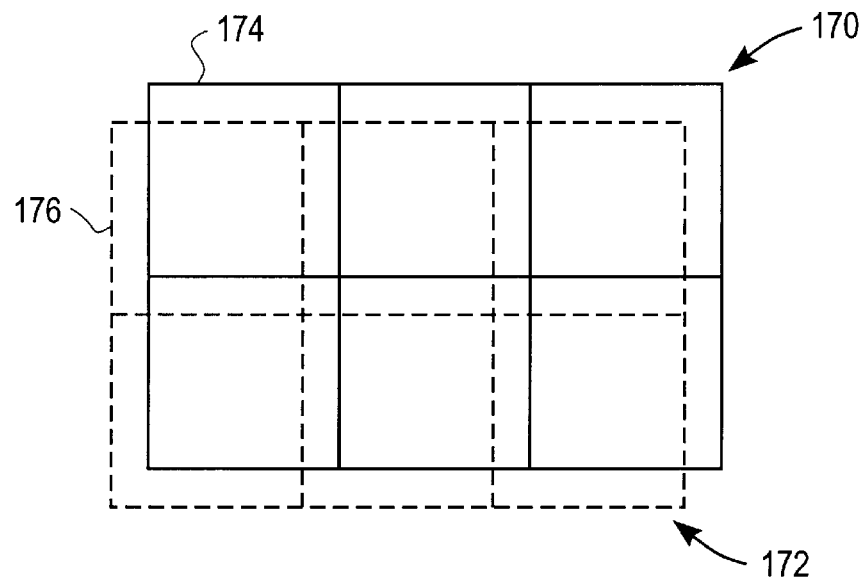
FIG. 9 illustrates two sets of polygons for which proximity is being measured.

FIG. 9 illustrates the effective usefulness of the proximity similarity metric. FIG. 9 includes a first set of polygons 170 and a second set of polygons 172. Each of the polygons in sets 170 and 172 are similar in area, rotation, and shape. If the proximity similarity metric is determined individually for each combination of polygon 174 in set 170 and each of the polygons in set 172, then the proximity similarity metric will be best for polygon 176. This is because the centroid of polygon 176 has the smallest displacement from the centroid of polygon 174.

Once the proximity similarity metric has been determined (step 160, FIG. 8), an area similarity metric is determined in step 162. First, N number of preliminary vectors are generated for each of the selected polygons. Each polygon's preliminary vectors are generated to extend from the polygon's centroid to each of the N points that were selected along the polygon's perimeter in determining the proximity similarity metric.

Next, a vector set is established for each polygon. For each polygon, the polygon's centroid is subtracted from the start point and end point of each preliminary vector in the polygon. As a result, the vectors each appear to extend from the origin. This removes the influence of the polygon's location on subsequent metrics.

Figure 10:
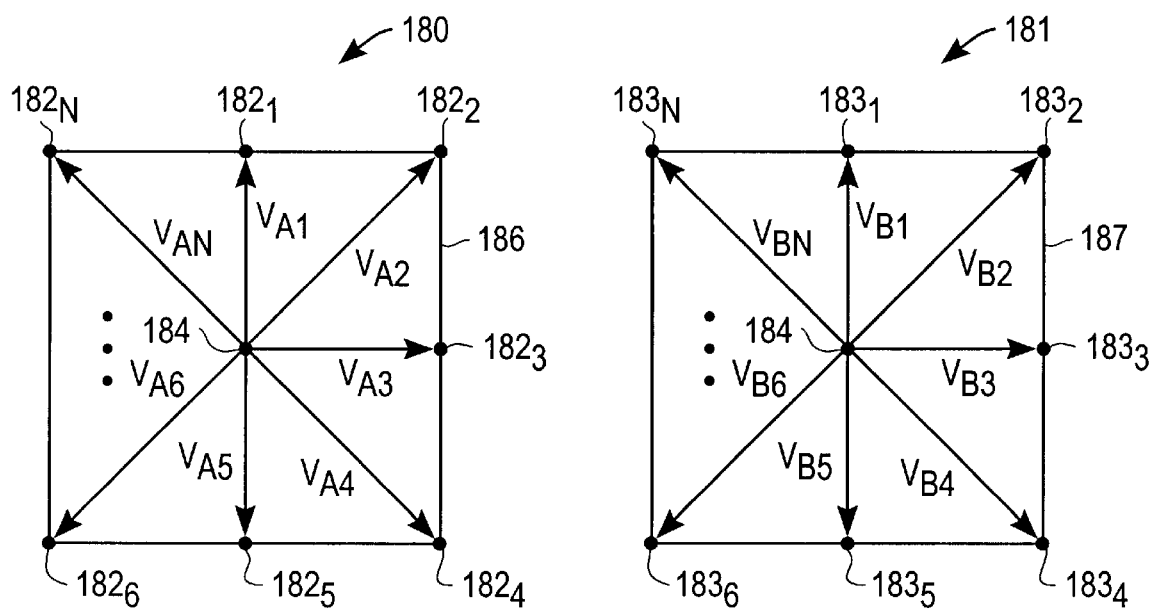
FIG. 10 illustrates polygons for which area values are being determined.

FIG. 10 illustrates sets of vector generated for a pair of polygons 180, 181. Vectors $V_{A1}$–$V_{AN}$ have been generated for polygon 180. Each of vectors $V_{A1}$–$V_{AN}$ extends from origin 184 to one of N points $182_{1-N}$ along the perimeter 186 of polygon 180. Vectors $V_{B1}$–$V_{BN}$ have been generated for polygon 181. Each of vectors $V_{B1}$–$V_{BN}$ extends from origin 184 to one of N points $183_{1-N}$ along the perimeter 187 of polygon 181.

Next an area value is calculated for each selected polygon, according to the following equation:

$$AV = \sum_{i=1}^{N} \|V_i\|^2 \qquad \text{Equation 4}$$

wherein:

AV is the area value; and $\|V_i\|$ is the length of an ith one of the vectors in the polygon.

Once an area value has been determined for each polygon, an area similarity metric is determined according to the following equation:

$$A = \frac{\text{MIN}(AV_A, AV_B)}{\text{MAX}(AV_A, AV_B)} \qquad \text{Equation 5}$$

wherein:

A is the area similarity metric;

$AV_A$ is the area value for the polygon in the first map;

$AV_B$ is the area value for the polygon in the second map;

MIN( ) is an instruction indicating that the lowest value appearing within the parentheses is to be selected; and MAX( ) is an operation indicating that the maximum value appearing between the parentheses is to be selected.

Accordingly, the area similarity metric will represent the ratio of the smallest area value to the largest area value for the two selected polygons.

Once the area similarity metric has been determined (step 162, FIG. 8), a shape similarity metric is determined in step 164. In order to determine the shape similarity metric, each of the vectors generated in each selected polygon is normalized according to the following equation:

$$V_{norm} = \left( \frac{x}{\sqrt{AV}}, \frac{y}{\sqrt{AV}} \right) \qquad \text{Equation 6}$$

wherein:

$V_{norm}$ is the normalized vector;

x is the vector's x-axis component;

y is the vector's y-axis component; and

AV is the area value for the polygon in which the vector resides.

The normalization discounts any area difference between the polygons, thereby allowing the shape determination to be made in isolation.

Next, a set of shape measures are obtained as the sum of the squares of vector differences between the two selected polygons' sets of normalized vectors at different rotations. The minimum shape measure value that is then designated as the shape similarity metric.

A shape measure for the ith rotation of the polygons is determined according to the following equation:

$$SM_i = \sum_{j=1}^{N} \|\overline{V_{Aj}} - \overline{V_{B(j+i)}}\|^2 \qquad \text{Equation 7}$$

wherein:

$SM_i$ is the ith shape measure;

$\overline{V_{Aj}}$ is the jth normalized vector in the polygon from the first map; and $\overline{V_{B(j+i)}}$ is the (j+i)th normalized vector in the polygon from the second map, wherein (j+i) is equal to the sum of j and i if the sum is less than or equal to N, else (j+i) is equal to the sum of j and i minus N.

The shape similarity metric is the minimum $SM_i$ value that is determined for i spanning a range from 0 to (N−1). By allowing i to span from 0 to (N−1), all of the possible shape measures between the two polygons are made.

In order to determine the shape similarity metric, the following equation is employed:

$$S = \text{MIN}(SM_i \text{ for } 0 \leq i \leq (N-1)) \qquad \text{Equation 8}$$

wherein:

S is the shape similarity metric.

Once the shape similarity metric has been determined (step 164, FIG. 8), a rotation similarity metric is determined in step 166. Using the rotation i value that yielded the minimum shape measure value ($SM_i$) a rotation measure is made of the angles between the corresponding vectors in the two polygons. The corresponding vectors are those that were subtracted (Equation 7) from each other when determining the shape measure value ($SM_i$) that was selected to be used as the shape similarity metric.

In one embodiment of the present invention, the rotation measure is calculated according to the following equation:

$$\theta = \left| \frac{\sum_{j=1}^{N} \angle(V_{Aj} - V_{B(j+i)})}{N} \right| \qquad \text{Equation 9}$$

wherein:

θ is the rotation measure;

$\angle(V_{Aj} - V_{B(j+i)})$ is an operation indicating that a measure is taken of the angle between the $V_{Aj}$ vector and the $V_{B(j+i)}$ vector;

$V_{Aj}$ is the jth vector in the selected polygon from the first map;

$V_{B(j+i)}$ is the (j+i)th vector in the selected polygon from the second map, wherein i is equal to the i value that yielded the shape measure value ($SM_i$) that was selected as the shape similarity metric, and wherein (j+i) is the same as described above with reference to Equation 7.

In one embodiment of the present invention, the angle between the vectors is determined by taking the arc tangent of the two vectors ($V_{Aj}$ and $V_{B(j+i)}$).

Once the rotation measure is obtained, it is used to calculate a rotation similarity metric according to the following equation:

$$R = \frac{(\Phi - \theta)}{(\Phi + \theta)} \text{ if } \Phi > \theta, \text{ else} \qquad \text{Equation 10}$$

$$R = 0$$

wherein:

R is the rotation similarity metric; and

Φ is a normalizing constant.

In one embodiment of the present invention, Φ is equal to 45°.

Once the rotation similarity metric is determined (step 166, FIG. 8), a matching metric is calculated for the selected pair of geometric objects in step 168. The matching metric is calculated by multiplying the proximity similarity metric (P), area similarity metric (A), shape similarity metric (S), and rotation similarity metric (R). This will yield a value ranging from negative infinity to 1, with 1 being the strongest level of matching.

As described above with reference to FIG. 7, the matching metric indicates a degree of similarity between polygons that is employed to pair matching polygons in the two maps (step 156, FIG. 7). In order for two polygons to be paired as matching, their matching metric must be equal to or greater than a minimum matching threshold. In one embodiment of the present invention, the minimum matching threshold is 0.35.

In some instances, polygons in one map can have matching metrics that exceed the minimum matching threshold for multiple polygons in the other map. However, each polygon in a map can only be paired with one other polygon in the other map to form a pair of matching polygons. No polygon can be paired as matching more than one other polygon.

In one embodiment of the present invention, when such multiple high matching metrics occur, the following rules are applied in pairing polygons as matching (step 156, FIG. 7):

1. For each polygon in the second map, pair it with the polygon in the first map that has the highest matching metric that exceeds the minimum matching threshold. In the case of a tie, select either one of the polygons in the first map that tied.
2. If multiple polygons in the second map are then paired to the same polygon in the first map, then select the pairing with the highest matching metric. In the case of a tie, select either one of the pairings.

Figure 11:
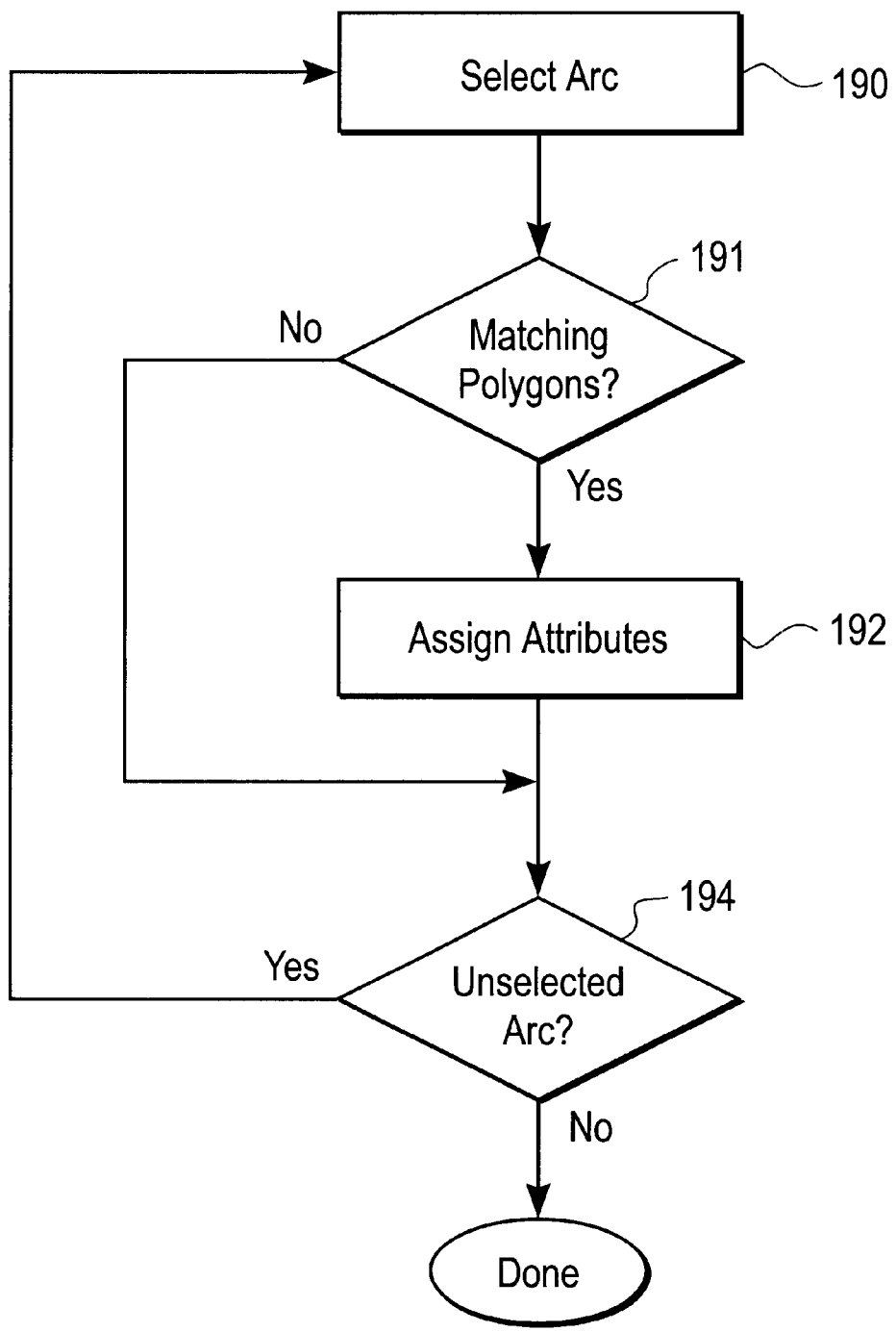
FIG. 11 illustrates a sequence of operations for assigning attributes to matching arcs.

As shown in FIG. 6, the matching polygons are now employed to designate matching arcs in the maps (step 142, FIG. 6). FIG. 11 illustrates a sequence of operations for designating the matching arcs. First, an arc in the first map is selected in step 190. Next, a determination is made of whether the arc is co-bounded on both sides by polygons that have been paired with a matching polygon in the second map (step 191).

If it is determined that the selected arc is co-bounded on both sides by polygons that have been paired with matching polygons in the second map, then the arc is assigned an attribute in step 192. The assigned attribute can then be employed in a process for identifying nodes in the first map that match nodes in the second map. In one embodiment of the present invention, the assigned attribute is a label formed by a concatenation of assigned unique identifiers for each co-bounding matched polygon. In an alternate embodiment, the assigned attribute is a label, such as a street name.

If the selected arc is determined not to be bounded on both sides by polygons that have been paired with matching polygons in the second map, or once an arc is assigned an attribute in step 192, then it is determined in step 194 whether any of the arcs in the first map have not yet been selected. If there are unselected arcs, then a new arc is selected in step 190 and the above-described process is repeated. Otherwise, the process of designating matching arcs is completed.

Once matching arcs have been identified (step 130 FIG. 5), matching points in the two maps are identified. As described above with reference to FIG. 5 (step 132), processes for identifying matching points are well known in the art.

In particular, a process described in U.S. Pat. No. 5,546,107 can be employed to identify such matching points by utilizing matching arcs for the two maps.

Figure 12:
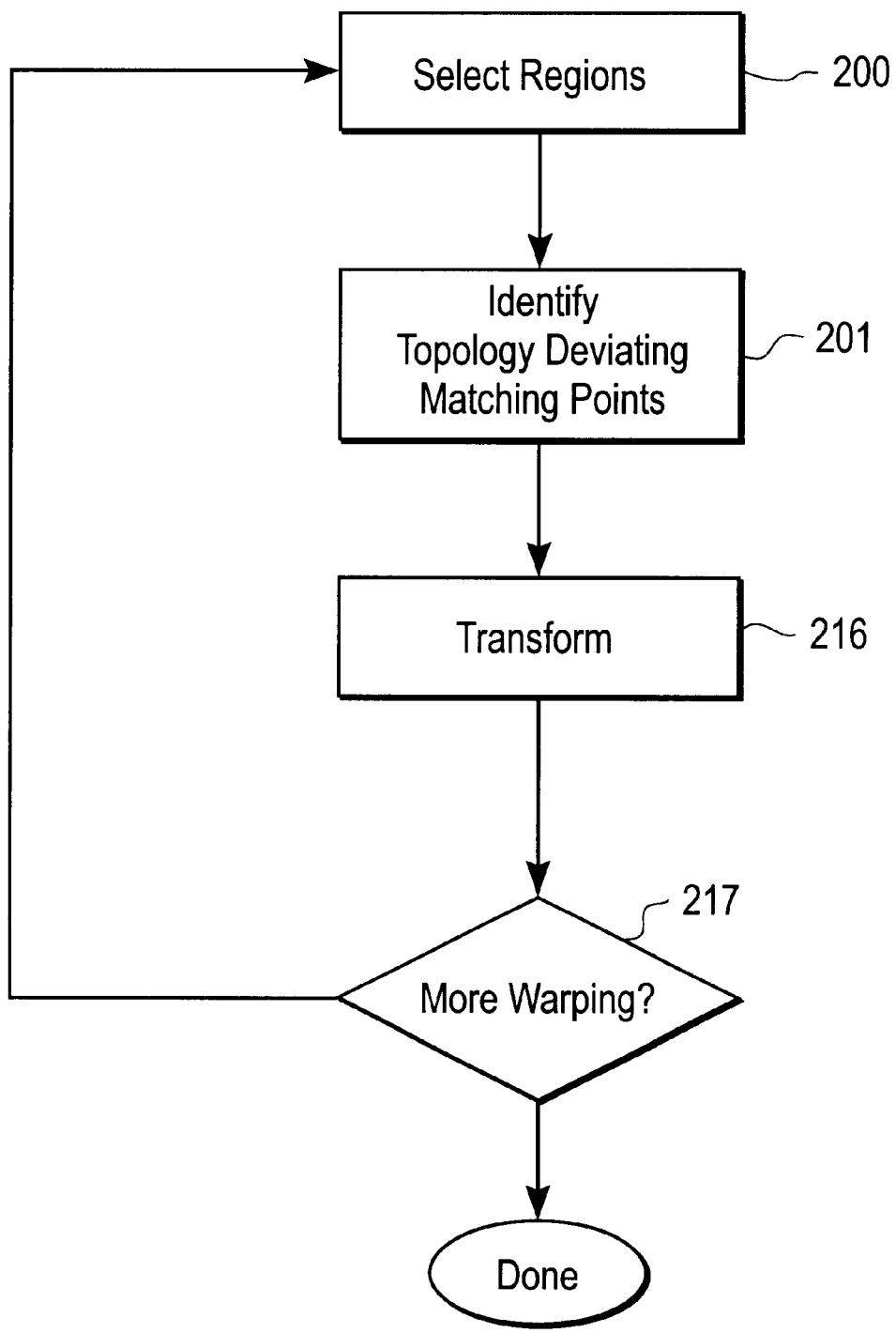
FIG. 12 illustrates a sequence of operations for warping a model in accordance with the present invention.

Once matching points in the two maps are identified (step 132, FIG. 5), the warping process (step 134) as described above with reference to FIG. 5 is initiated. FIG. 12 illustrates a sequence of operations that are performed in order to effectuate the warping in one embodiment of the present invention. First, a corresponding pair of regions are identified in the first map and the second map in step 200. As described above, these regions must correspond to the same physical area in each map. The importance of this requirement will be explained in greater detail below. By performing the warping on selected regions, local distortions in the first and second maps are effectively corrected, without being affected by distortions in other regions.

Once the regions are selected, the matching points in the selected regions that have potential for causing a topology deviation in the new map that is to result from warping are identified in step 201. An example of such a topology deviation is an inversion of geometric objects. These points are identified, so that they will not be incorporated in the creation of transformation equations that are used in the warping process. A process for identifying such points in one embodiment of the present invention will be described in greater detail below.

After the point identification process in step 201 is complete, the selected region in the first map is transformed to form a new map in step 216. This transformation is performed using a set of equation that are derived from the relationship between corresponding matching points in the first and second maps, except for the points identified in step 201. A process for performing such a transformation in one embodiment of the present invention will be described in greater detail below.

After the transformation of the selected region in the first map (step 216) is done, a determination is made in step 217 of whether more warping is desired. If more warping is desired, then a new pair of regions is selected in step 200 and the above-described process steps are updated. Otherwise, the warping is done.

Figure 13:
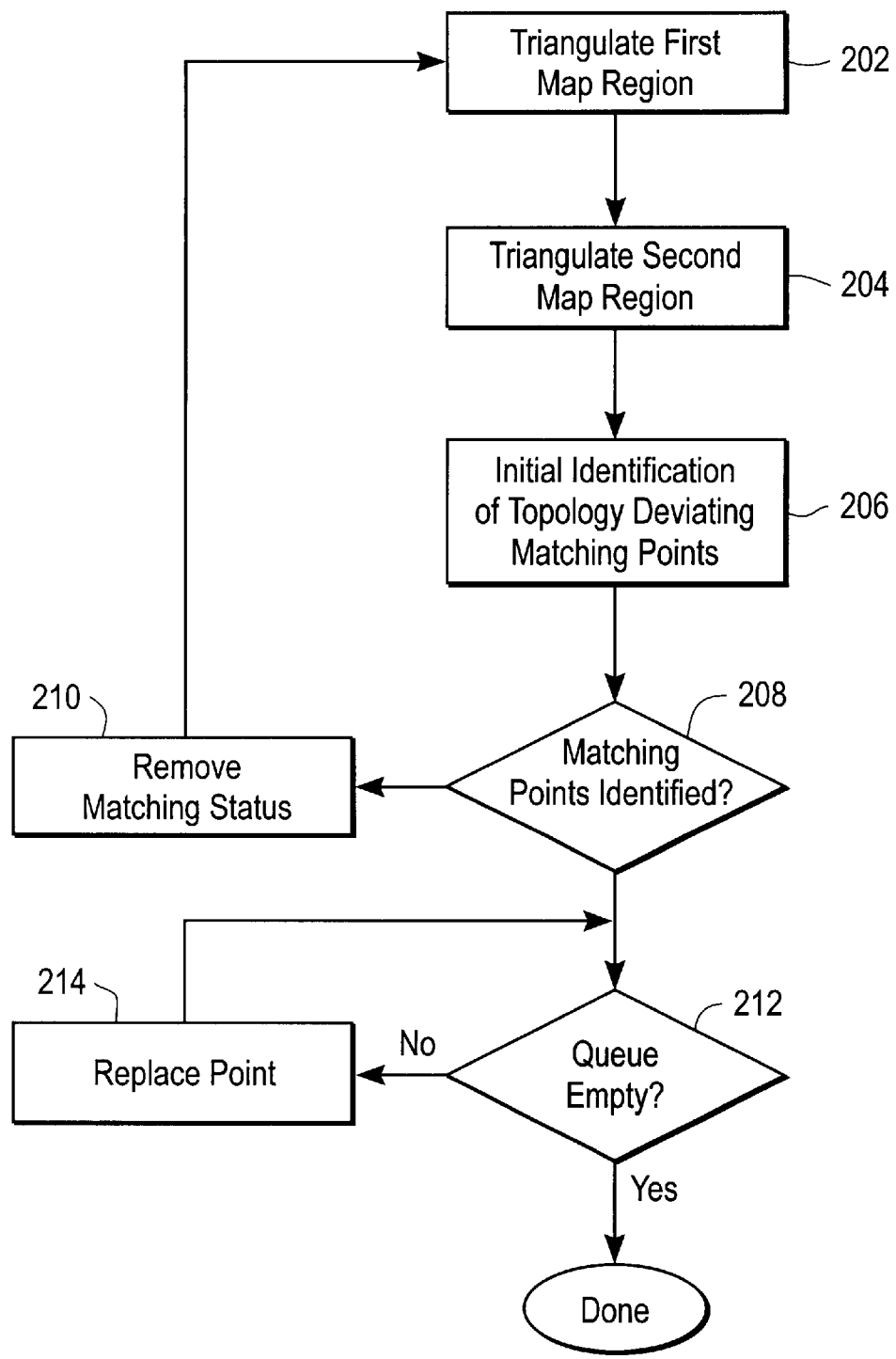
FIG. 13 illustrates a sequence of operations for identifying matching points that have potential for causing topology deviations.

FIG. 13 illustrate a sequence of operation performed in one embodiment of the present invention for identifying matching point having potential for causing topology deviations (step 201, FIG. 12). First, the selected region in the first map is triangulated in step 202. A triangulation is performed by forming a set of triangles within the region using the matching points in the region and the boundary points that define the vertices of the region selected for warping. For purposes of this Application, these boundary points will also be referred to as matching points. In triangulation, one edge is drawn between each matching point in the selected region of the first map, such that each edge belongs to either two triangles or one triangle and the area outside of the selected region.

In one embodiment of the present invention, a Delaunay triangulation is performed. For each set of points in a two-dimensional plane, there exists a unique Delaunay triangulation. In a Delaunay triangulation, the triangles that are formed are all made to be as close as possible to being equilateral triangles. In a Delaunay triangulation of a set of points, no point in the set of points falls in the interior of a circle that passes through all three vertices of any triangle in the triangulation. Methods for performing Delaunay triangulation are well known in the art and in fact are prior art with respect to this Application.

A further explanation of Delaunay triangulation can be found in the following references:

"Mesh Generation and Optimal Triangulation" by Marshall Bern and David Epstein, which was published in Computing and Euclidean Geometry, Ding-Zhu Du and Frank Hwang editors, World Scientific, Singapore, pp. 23–90, 1992;

Jonathan Richard Shewchuk, "Triangle: Engineering a 2D Quality Mesh Generator and Delaunay Triangulator", First Workshop on Applied Computational Geometry (Philadelphia, Pennsylvania) pages 124–133, ACM, May 1996; and Jim Ruppert, "A Delaunay Refinement Algorithm for Quality 2-Dimensional Mesh Generation", Journal of Algorithms 18(3): 548–585, May 1995.

The above-cited references are hereby incorporated by reference. Further information concerning Delaunay triangulation can be found at the following location on the Internet: http://www.cs.cmu.edu/~quake/triangle.html.

Once the triangulation of the selected region in the first map is completed, the same triangulation is applied to the selected region in the second map in step 202. In applying the triangulation to the second map, a new triangulation process is not executed. Instead, edges are formed between the same matching points in the selected region in the second map as were formed between the corresponding matching points in the selected region in the first map.

Figure 14:
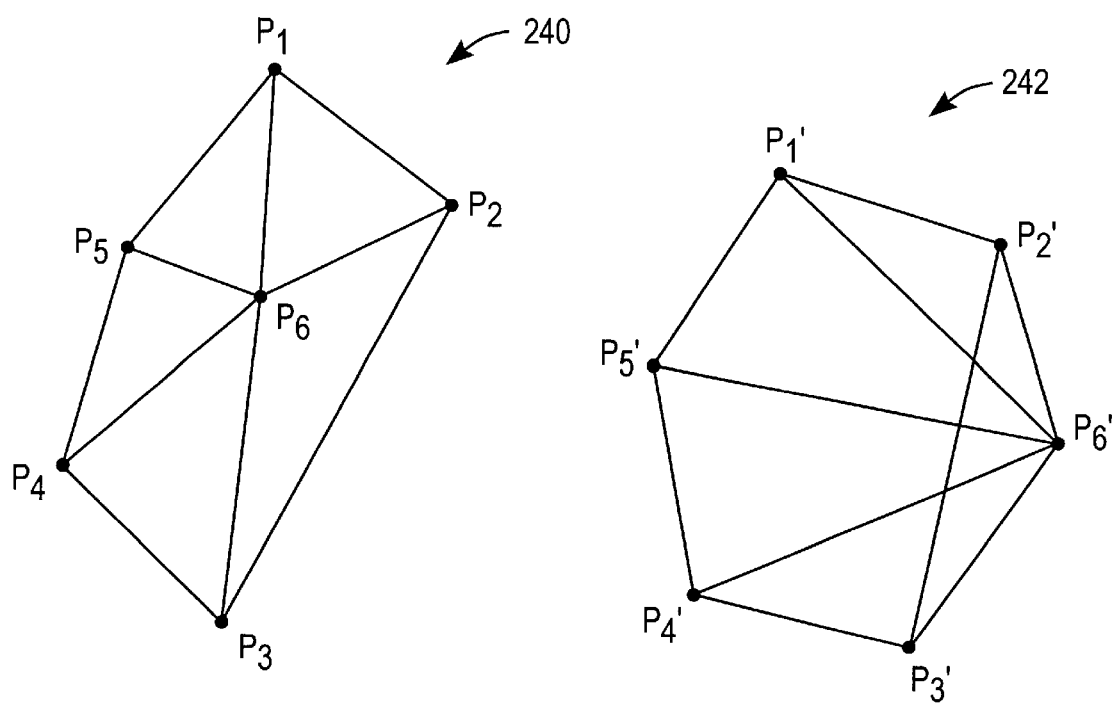
FIGS. 14 illustrates the results of performing a triangulation on a first set of matching points and applying the same triangulation to a corresponding second set of matching points.

FIG. 14 illustrates the results of the triangulation of a selected region in the first map and a selected region in the second map, in accordance with the present invention. In FIG. 14, a set 240 of points $P_1$–$P_6$ are all of the matching points in the selected region of the first map. A triangulation of these points could result in the following triangles being formed (Please note that these triangles are not drawn to scale for the purpose of demonstrating a Delaunay triangulation):

($P_1$, $P_6$, $P_5$)
($P_5$, $P_6$, $P_4$)
($P_6$, $P_4$, $P_3$)
($P_6$, $P_3$, $P_2$)
($P_1$, $P_2$, $P_6$).

A set 242 of points $P_1'$–$P_6'$ are the matching points in the selected region of the second map that match points $P_1$–$P_6$, respectively. As shown in FIG. 14, the same triangles that were formed using points $P_1$–$P_6$ are formed in the selected region of the second map to form the following corresponding triangles:

($P_1'$, $P_6'$, $P_5'$)
($P_5'$, $P_6'$, $P_4'$)
($P_6'$, $P_4'$, $P_3'$)
($P_6'$, $P_3'$, $P_2'$)
($P_1'$, $P_2'$, $P_6'$).

Once the triangulation is completed for both of the selected regions, an initial identification of topology deviating matching points is performed in step 206. This determination is made in one embodiment by comparing each triangle in the selected region of the first map to a corresponding triangle in the selected region of the second map. In one such embodiment, the comparison is made to determine whether the triangles being compared are inverted. Such an inversion indicates that there is a potential for topology deviations. The fact that an inversion identifies potential for topology deviation is a result of the selected regions corresponding to the same physical area in the first and second maps, as described above.

Figure 15:
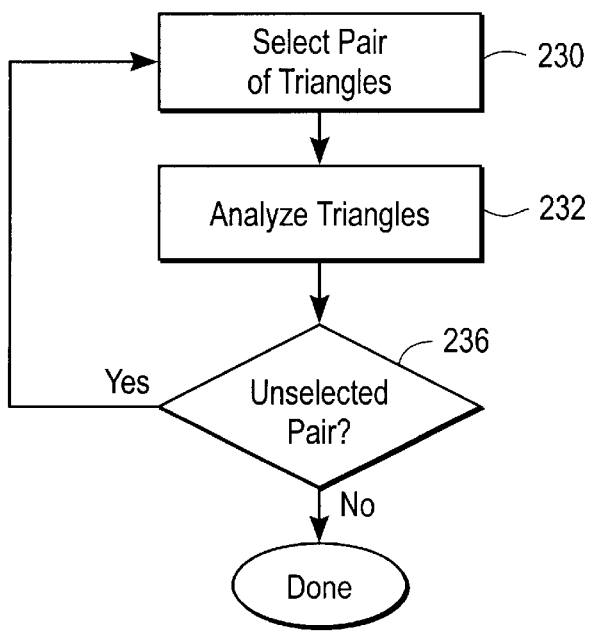
FIG. 15 illustrates a sequence of operations for initially identifying matching points that may cause topology deviations.

FIG. 15 illustrates a sequence of operations performed in a accordance with the present invention to make an initial identification of whether matching points in the selected regions of the first and second maps have potential for causing topology deviations (step 206, FIG. 13). First, a pair of triangles is selected in step 230. The selected pair includes a triangle from the selected region of the first map and a triangle from the selected region of the second map, wherein the triangle in the second map has vertices that are matching points of the vertices of the triangle in the first map.

Next, the selected triangles are analyzed to determine whether the matching points making up the vertices of the triangles have potential for causing topology deviations. One aspect of this determination is determining whether the triangles are inverted from one another. As described above, such an inversion signals the existence of a matching point with potential for causing topology deviations.

FIG. 14 illustrates a pair of inverted triangles. As described above, FIG. 14 shows a set 240 of triangulated matching points ($P_1$–$P_6$) for a selected region in the first map and a set 242 of triangulated matching points ($P_1'$–$P_6'$) for a corresponding selected region in the second map. Triangle ($P_6$, $P_3$, $P_2$) and corresponding triangle ($P_6'$, $P_2'$, $P_3'$) are inverted with respect to one another. These triangles are considered to be inverted, because the $P_6$ and $P_6'$ points lie on opposite sides of the edge passing between $P_3$, $P_2$ and $P_2'$, $P_3'$.

In order to determine whether triangles are inverted in one embodiment of the present invention, cross product calculations are employed. A cross product is taken of any two edges in the selected triangle in the first map, and a cross product is taken of the same two edges in the corresponding triangle in the second map. For example, with reference to FIG. 14, the cross products could be taken of the $P_3$, $P_6$ edge and $P_3$, $P_2$ edge in set 240 and the $P_3'$, $P_6'$ edge and $P_3'$, $P_2'$ edge in set 242.

In taking the cross product of two edges, each edge is treated as a vector extending from the point where the edges intersect. For example, the $P_3$, $P_6$ edge and $P_3$, $P_2$ edge are treated as a first vector from $P_3$ to $P_6$ and a second vector from $P_3$ to $P_2$. When taking the cross product of these vectors, the following equation is employed:

$$CP = (x_{e1} - x_{s1}) \times (y_{e2} - y_{s2}) - (x_{e2} - x_{e2}) \times (y_{e1} - y_{s1}) \quad \text{Equation 11}$$

wherein:

CP is the cross product;

$x_{e1}$ is the x coordinate of the end point of the first vector;

$x_{s1}$ is the x coordinate of the start point of the first vector;

$y_{e1}$ is the y coordinate of the end point of the first vector;

$y_{s1}$ is the y coordinate of the start point of the first vector;

$x_{e2}$ is the x coordinate of the end point of the second vector;

$x_{s2}$ is the x coordinate of the start point of the second vector;

$y_{e2}$ is the y coordinate of the end point of the second vector; and $y_{s2}$ is the y coordinate of the start point of the second vector.

If cross products for both of the triangles being compared have the same sign (i.e. positive-positive or negative-negative), then there is no inversion. However, if the cross products are of opposite signs, such as positive-negative or negative-positive, then the triangles are inverted and both considered to contain matching points that have potential for causing topology deviations. If either of the cross products is 0, then the matching points associated with both triangles are also considered to have a potential for causing topology deviations.

In addition to determining whether triangles are inverted in step 232 (FIG. 15), in one embodiment of the present invention, triangle dimensions are also evaluated. For example, if either triangle in a selected pair of corresponding triangles does not have at least a minimum area, then the associated matching points for both triangles are considered to have the potential for causing topology deviations. Additionally, if either triangle of a corresponding pair of triangles does not have at least a minimum height, as its smallest height, then the matching points for both triangles are considered to have potential for causing topology deviations. In one such embodiment, the minimum area threshold is 15 square inches, and the minimum height threshold is 3 inches. Testing for minimum height and area accounts for potential problems with precision on a digital computer. Without this test, a triangle with all its contents can be potentially warped to become a tiny triangle, which may not have enough room to hold all the contents of the original triangle.

Once the selected triangles have been analyzed (step 232, FIG. 15), a determination is made of whether any pair of triangles has not yet been selected in step 236 (FIG. 15). If it is determined that there is a pair of triangles that has not yet been selected, then a new pair of triangles is selected in step 230 and the above-described process is repeated. Otherwise, the initial identification of matching points that have potential for causing topology deviations is completed.

Once the matching points with potential for causing topology deviations have been identified (step 206, FIG. 13), a determination is made in step 208 (FIG. 13) of whether any such points were in fact identified in the last time that step 206 was executed. If it is determined that such undesirable matching points were identified, then a set of these undesirable matching points lose their status as matching points and are placed in a bad point queue in step 210. When a matching point loses its matching status, any triangle having the point as a vertex is considered to be removed. In one embodiment of the present invention, the matching points that lose their status are the matching points that were most frequently identified as having potential for causing topology deviations the last time that step 206 was executed. In an alternate embodiment, points continue to lose matching status, until all inverted or undesirably dimensioned triangles are removed.

After matching status is removed, the selected region from the first map and the selected region in the second map are triangulated again in steps 202 and 204, respectively, using only the matching points that have not lost their matching point status. The above-described initial identification step (206) is then repeated.

If it is determined in step 208 that no matching points were identified as having potential for causing topology deviations in the last time that step 206 was executed, then a determination is made of whether the bad point queue is empty in step 212. The bad point queue is considered to be empty when it contains either no points or only points that are incapable of regaining matching status, as will be described below. If the bad point queue is not empty, then an attempt is made to replace a point in the queue in the selected regions in step 214. If the point can be successfully replaced into the selected regions, so that it no longer is considered to have potential for causing a topology deviation, then the point's status as a matching point is returned. A method for attempting such a replacement will be described below.

Once a replacement attempt (step 214) has been made, it is once again determined whether or not the bad point queue is empty in step 212. If it is determined that the bad point queue is empty, then the process of identifying matching points with potential for causing topology deviations (step 201, FIG. 12) is done.

Figure 16:
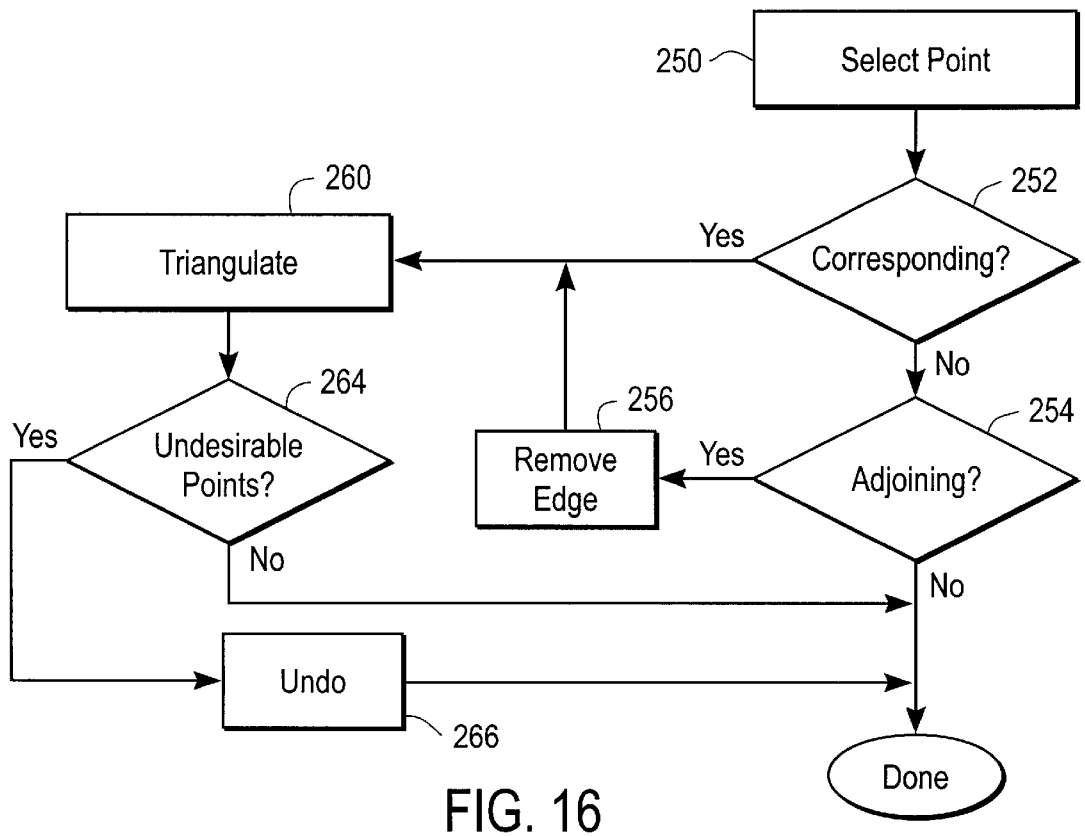
FIG. 16 illustrates a sequence of operations for replacing matching points.

FIG. 16 illustrates a sequence of operations for attempting to replace a point from the bad point queue into the selected regions (step 214, FIG. 13). First, a point in the bad point queue is selected in step 250. Next, a determination is made of whether the point resides within corresponding triangles in the selected region in the first map and the selected region in the second map (step 252). FIG. 17(*a*) illustrates a situation in which point 272 resides within both triangle 270 with vertices ($P_1$, $P_2$, $P_3$) in the selected region of the first map and corresponding triangle 274 with vertices ($P_1'$, $P_2'$, $P_3'$) in the selected region of the second map.

If it is determined that the selected point does not reside within corresponding triangles, then it is determined in step 254 whether the selected point resides within adjoining triangles in the selected regions of the first and second maps. Such a circumstance of a point residing in adjoining triangles is shown in FIG. 18(*a*). In the selected region in the first map, point 294 resides within triangle 292 with vertices ($P_1$, $P_2$, $P_3$), which adjoins triangle 290 with vertices ($P_4$, $P_2$, $P_3$). In the selected region in the second map, point 294 resides within triangle 296, which has vertices ($P_4'$, $P_2'$, $P_3'$) and corresponds to triangle 290. Triangle 296 is also adjoined by triangle 298 which corresponds to triangle 292 and has vertices ($P_1'$, $P_2'$, $P_3'$). If it is determined in step 254 that the selected point does not reside in adjoining regions, then the point is not replaced, and the replacement attempt is done.

If it is determined in step 252 that the point resides in corresponding triangles in the selected regions of the first and second maps, then a new triangulation is performed in each of the corresponding triangles using the selected point in step 260. In each corresponding triangle, the point is connected by an arc to each vertex of the triangle to achieve the new triangulation. An example of such a triangulation for a point 272 that resides in corresponding triangles 270 and 274 is shown in FIG. 17(*b*).

Once the triangulation is complete, a determination is made of whether any of the matching points involved in either of the new triangulations or the replaced bad point have the undesirable potential for causing topology deviations (step 264). In one embodiment, this determination is made as described above with respect to step 206 in FIG. 13. If such undesirable points are identified in step 264, then the selected bad point is not replaced, and the triangulations performed with the selected bad point are undone in step 266. Otherwise, the replacement process for the selected point is complete, with the selected point regaining its status as a matching point and being removed from the bad point queue, and the new triangulations being left in place.

If it was determined in step 254 (FIG. 16) that the selected point resides in adjoining triangles in the selected regions (as shown in FIG. 18(*a*)), then the corresponding adjoining triangles in each region are made into a single polygon in step 256. This is achieved by removing the common edge that the adjoining triangles share in each of the selected regions.

Next, a triangulation is performed in step 260 as described above, using the vertices of the adjoining triangles in each selected region and the selected bad point. Such a triangulation is illustrated in FIG. 18(*b*), for the triangles and selected point 294 shown in FIG. 18(*a*). As shown in FIG. 18(*b*), the corresponding edges between points $P_2$ and $P_3$ and points $P_2'$ and $P_3'$ were removed before triangulating.

After the triangulation process (step 260), a determination is made in step 264, as described above, to detect the existence of points with the potential for causing topology deviations. If such points are detected in step 264, then both triangulations are undone; the edges removed to facilitate the triangulation are replaced, and the selected bad point maintains its bad point status. Otherwise, the bad point regains its matching point status and is removed from the bad point queue; the new triangulations remain in place, and the replacement process (step 214, FIG. 13) is done.

As shown in FIG. 13, once the bad point queue is determined to be empty (step 212), such that it contains no bad points or only bad points that cannot be triangulated without causing potential for topological deviations, the identification of matching points with potential for causing topology deviations (step 201, FIG. 12) is done. At this point, the transformation process (step 216, FIG. 12) is initiated.

FIG. 19 illustrates a sequence of operations that are performed in one embodiment of the present invention to execute the transformation. First, a set of transformation equations are generated in step 360. A set of transformation equations are generated for each pair of corresponding triangles in the selected region of the first map and the selected region of the second map. Each point within a triangle in the selected region in the first map is referred to by a pair of coordinates (x, y), and each point within a triangle in the selected region in the second map is identified by a set of coordinates (x', y'). Each x' coordinate can be expressed by the following equation:

$$x' = ax + by + c \qquad \text{Equation 12}$$

wherein:

a, b, and c are constants for a pair of corresponding triangles.

Each y' coordinate can be identified according to the following equation:

$$y' = dx + ey + f \qquad \text{Equation 13}$$

wherein:

d, e, and f are constants for a pair of corresponding triangles.

Equations 12 and 13 are known as affine equations, which can be used to transform points within one geometric object and to points in another geometric object. In accordance with the present invention, each pair of corresponding triangles is employed to solve for a set of the a, b, c, d, e, and f constants, so that a set of affine equations is defined for each pair of corresponding triangles. Each set of affine equations for a triangle in the selected region of the first map is then used, as described below, for transforming points in the triangle into points in a new map.

The constants in the affine equations for each pair of corresponding triangles are determined by applying well known algebra techniques. Each vertex in a triangle in the selected region of the first map and a corresponding triangle vertex in the second map are known. The coordinates for each vertex in a pair of corresponding triangles are plugged into the affine equations to obtain 6 affine equations for the pair of corresponding triangles These 6 equations are then employed to solve for the six a, b, c, d, e, and f constants using standard well known algebra techniques.

For example, if a triangle in the selected region of the first map has vertices $\{(x_1, y_1), (x_2, y_2), (x_3, y_3)\}$ and a corresponding triangle in the second selected region of the map has corresponding matching point vertices $\{(x_1', y_1'), (x_2', y_2'), (x_3', y_3')\}$, then the following affine equations can be set forth for determining the a, b, c, d, e, and f constants:

$$x_1' = ax_1 + by_1 + c \qquad \text{Equation 14}$$

$$x_2' = ax_2 + by_2 + c \qquad \text{Equation 15}$$

$$x_3' = ax_3 + by_3 + c \qquad \text{Equation 16}$$

$$y_1' = dx_1 + ey_1 + f \qquad \text{Equation 17}$$

$$y_2' = dx_2 + ey_2 + f \qquad \text{Equation 18}$$

$$y_3' = dx_3 + ey_3 + f \qquad \text{Equation 19}$$

These equations can be solved to find the a, b, c, d, e, and f constants for the pair of corresponding triangles, thereby making the affine equations for the pair of corresponding triangles known. This process is repeated, so that affine equations are determined for each pair of triangles in the selected regions of the first and second maps.

Once the set of affine equations are determined for each pair of corresponding triangles in the selected regions of the first and second maps (step 360, FIG. 19), a set of arc intersection points in the selected region of the first map are identified in step 362. Each arc in the selected region in the first map is evaluated to determine whether is contains a location that is to be identified as an arc intersection point.

An arc intersection point is a location on an arc in the selected region of the first map at which the arc crosses an edge belonging to two adjoining triangles. Such a location 370 is illustrated in FIG. 20(a). Arc 376 extends between point 380 in triangle 372 and point 381 in triangle 374. Point 370 is a location on arc 376 that intersects edge 382, which is shared by triangles 372 and 374. Prior to transformation, arc 378 does not intersect arc 376. In order to preserve topology when performing a transformation to obtain a new map, transformations of arc 376 and arc 378 must also not intersect in the new map.

FIG. 20(b) shows the desirable result after transformation, with arc 376 being re-shaped into two arc portions 376a and 376b that do not intersect arc 378'. However, if no special measures are taken, it is possible that transformation will result in the situation shown in FIG. 20(c). In FIG. 20(c), the end points of transformed arc 376' are the only points on arc 376 that were transformed. As a result, the transformation causes transformed arc 376' to be falsely intersected with transformed arc 378'.

In order to avoid the topology deviation shown in FIG. 20(c), the location where arc 376 intersects edge 382 (FIG. 20(a)) is identified as an arc intersection point. As a result, an arc intersection point is created at location 370. This shape point will be transformed in step 364 (FIG. 19), as described below, to generate point 370', which will be connected to arc portions 376a and 376b, as shown in FIG. 20(b).

Once all of the arc intersection points in the selected region of the first map have been identified, the point transformation in step 364 (FIG. 19) is performed. In the point transformation step 364, each point (x, y) in the selected region of the first map is transformed to a point (x', y') in a new map, using the affine equations for the triangle in which the first map point (x, y) resides. The point transformation step is also performed on all arc intersection points identified in step 362. As a result, all points of a new map of the selected region are generated.

Once the points in the selected region of the first map are all transformed, the arc connections between the points in the selected region of the first map are replicated between the corresponding newly generated points in step 366. For example, an arc connected to point (x, y) in the first map is connected to point (x', y') in the new map, wherein x' and y' are derived from x and y using the affine equations.

A system for performing repositioning in accordance with the present invention, as described above, may be implemented in hardware and/or software. In one implementation, the system for repositioning comprises a dedicated processor including processor instructions for performing the functions described herein. Circuits may also be developed to perform the functions described herein. In one embodiment, the system for performing repositioning is part of a repositioning system. The repositioning system can be a general purpose computer with repositioning software. In another implementation, the system for repositioning includes a plurality of computer executable instructions for implementation on a general purpose computer system. Prior to loading into a general purpose computer system, the software may reside as encoded information on a computer readable medium, such as a magnetic floppy disk, magnetic tape, and compact disc read only memory (CD-ROM).

FIG. 21 illustrates a high level block diagram of a general purpose computer system 410 in which the present inventions system for performing repositioning is implemented in one embodiment. In particular, system 410 can be employed to perform the process steps described above with reference to FIGS. 5–20.

Computer system 410 contains a processor unit 412 and main memory 414. Processor unit 412 is a single microprocessor in one embodiment, and contains a plurality of microprocessors for configuring the computer system 410 as a multi-processor system in another embodiment. Main memory 414 stores, in part, instructions and data for execution by processor unit 412. When the process steps of the present invention for performing repositioning are wholly or partially implemented in software, main memory 414 stores the executable code during the system's operation. Main memory 414 can include banks of dynamic random access memory (DRAM) as well as high speed cache memory.

Computer system 410 further includes a mass storage device 416, peripheral device(s) 418, input device(s) 420, portable storage medium drive(s) 422, a graphics subsystem 424 and an output display 426. For purposes of simplicity, the components in computer system 410 are shown in FIG. 21 as being connected via a single bus 428. However, in alternate embodiments, computer system 410 is connected through one or more data transport means. For example, processor unit 412 and main memory 414 may be connected via a local microprocessor bus, and the mass storage device 416, peripheral device(s) 418, portable storage medium drive(s) 422, and graphics subsystem 424 may be connected via one or more input/output (I/O) buses. Mass storage device 416, which may be implemented with a magnetic disk drive or an optical disk drive, is a non-volatile storage device for storing data and instructions for use by processor unit 412. In one embodiment, mass storage device 416 stores the system software for performing repositioning for purposes of loading to main memory 14.

Portable storage medium drive 422 operates in conjunction with a portable non-volatile storage medium, such as a floppy disk, to input and output data and code to and from computer system 410. In one embodiment, the system software for determining a path is stored on such a portable medium, and is input to the computer system 410 via the portable storage medium drive 422. Peripheral device(s) 418 may include any type of computer support device, such as an input/output (I/O) interface, to add additional functionality to the computer system 410. For example, peripheral device(s) 418 may include a network interface card for interfacing computer system 410 to a network, a modem, etc.

Input device(s) 420 provide a portion of the user interface for a user of computer system 410. Input device(s) 420 may include an alpha-numeric keypad for inputting alphanumeric and other key information, or a cursor control device, such as a mouse, a trackball, stylus, or cursor direction keys. In order to display textual and graphical information, computer system 410 contains graphics subsystem 424 and the output display 426. Output display 426 may include a cathode ray tube (CRT) display, liquid crystal display (LCD) or other suitable display device. Graphics subsystem 424 receives textual and graphical information, and processes the information for output to output display 426. Output display 426 can be used to report the results of a repositioning. The components contained in computer system 410 are those typically found in general purpose computer systems, and are intended to represent a broad category of such computer components that are well known in the art. The system of FIG. 21 illustrates one platform which can be used for the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and so on.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer implemented method for forming a first set of geometric objects, based on a second set of geometric objects and a third set of geometric objects, wherein said second set of geometric objects contains a second set of matching points and said third set of geometric objects contains a third set of matching points, wherein each matching point in said second set of matching points corresponds to a matching point in said third set of matching points, said method comprising the steps of:

(a) identifying matching points in said second set of matching points and corresponding matching points in said third set of matching points that have potential for causing topology deviations in the first set of geometric objects; and (b) transforming points in said second set of geometric objects to obtain points in said first set of geometric objects, based on relationships between corresponding matching points in said second set of matching points and said third set of matching points other than said matching points identified in said step (a).

2. The method of claim 1, wherein said step (a) includes the steps of:

triangulating said second set of matching points to obtain a second set of triangles;

triangulating said third set of matching points to obtain a third set of triangles; and making an initial identification of matching points in said second set of matching points and said third set of matching points that have potential for causing topology deviations in said first set of geometric objects.

3. The method of claim 2, wherein said step of making an initial identification includes the steps of:

selecting a pair of triangles, wherein said pair includes a second triangle in said second set of triangles and a third triangle that is in said third set of triangles and corresponds to said second triangle; and analyzing said pair of triangles to determine whether vertices of triangles in said pair are matching points that have potential for causing topology deviations in said first set of geometric objects.

4. The method of claim 3, wherein said step of analyzing includes the step of:

determining whether said second triangle and said third triangle are inverted.

5. The method of claim 3, wherein said step of analyzing includes the step of:

determining whether either of said second triangle and said third triangle have acceptable dimensions.

6. The method of claim 5, wherein said step of determining whether either of said second triangle and said third triangle have acceptable dimensions, includes the step of:

determining whether either said second triangle or said third triangle has an area less than a minimum acceptable area.

7. The method of claim 5, wherein said step of determining whether either of said second triangle and said third triangle have acceptable dimensions, includes the step of:

determining whether either said second triangle or said third triangle has a height less than a minimum acceptable height.

8. The method of claim 2, wherein said step (a) further includes the step of:

removing matching status of a set of matching points identified in said step of making an initial identification.

9. The method of claim 8, wherein said step (a) further includes the step of:

replacing a point that had matching status removed in said step of removing matching status.

10. The method of claim 8, wherein said step (a) further includes the steps of:

triangulating said second set of matching points to obtain a new second set of triangles, after performing said step of removing matching status;

triangulating said third set of matching points to obtain a new third set of triangles, after performing said step of removing matching status; and making an initial identification of matching points in said second set of matching points and said third set of matching points that have potential for causing topology deviations in said first set of geometric objects, after performing said step of removing matching status.

11. The method of claim 10, wherein said step (b) includes the steps of:

generating a set of transformation equations;

identifying a set of arc intersection points in said new second set of geometric objects; and performing a point transformation on points and arc intersection points in said second set of geometric objects using said set of transformation equations to obtain points for said first set of geometric objects.

12. The method of claim 11, wherein said set of transformation equations includes transformation equations for each corresponding pair of triangles in said new second set of triangles and said new third set of triangles.

13. The method of claim 11, wherein said step (b) further includes the step of:

making arc connections between said points for said first set of geometric objects.

14. The method of claim 1, wherein said second set of geometric objects represents a physical area and said third set of geometric objects represents said physical area.

15. A processor readable storage medium having processor readable code embodied on said processor readable storage medium, said processor readable code for programming a processor to perform a method for forming a first set of geometric objects, based on a second set of geometric objects and a third set of geometric objects, wherein said second set of geometric objects contains a second set of matching points and said third set of geometric objects contains a third set of matching points, wherein each matching point in said second set of matching points corresponds to a matching point in said third set of matching points, said method comprising the steps of:

(a) identifying matching points in said second set of matching points and corresponding matching points in said third set of matching points that have potential for causing topology deviations in the first set of geometric objects; and (b) transforming points in said second set of geometric objects to obtain points in said first set of geometric objects, based on relationships between corresponding matching points in said second set of matching points and said third set of matching points other than said matching points identified in said step (a).

16. The processor readable storage medium of claim 15, wherein said step (a) includes the steps of:

triangulating said second set of matching points to obtain a second set of triangles;

triangulating said third set of matching points to obtain a third set of triangles; and making an initial identification of matching points in said second set of matching points and said third set of matching points that have potential for causing topology deviations in the first set of geometric objects.

17. The processor readable storage medium of claim 16, wherein said step of making an initial identification includes the steps of:

selecting a pair of triangles, wherein said pair includes a second triangle in said second set of triangles and a third triangle that is in said third set of triangles and corresponds to said second triangle; and analyzing said pair of triangles to determine whether vertices of triangles in said pair are matching points that have potential for causing topology deviations in said first set of geometric objects.

18. The processor readable storage medium of claim 17, wherein said step of analyzing includes the step of:

determining whether said second triangle and said third triangle are inverted.

19. The processor readable storage medium of claim 17, wherein said step of analyzing includes the step of:

determining whether either of said second triangle and said third triangle have acceptable dimensions.

20. The processor readable storage medium of claim 19, wherein said step of determining whether either of said second triangle and said third triangle have acceptable dimensions, includes the step of:

determining whether either said second triangle or said third triangle has an area less than a minimum acceptable area.

21. The processor readable storage medium of claim 19, wherein said step of determining whether either of said second triangle and said third triangle have acceptable dimensions, includes the step of:

determining whether either said second triangle or said third triangle has a height less than a minimum acceptable height.

22. The processor readable storage medium of claim 16, wherein said step (a) further includes the step of:

removing matching status of a set of matching points identified in said step of making an initial identification.

23. The processor readable storage medium of claim 22, wherein said step (a) further includes the step of:

replacing a point that had matching status removed in said step of removing matching status.

24. The processor readable storage medium of claim 22, wherein said step (a) further includes the steps of:

triangulating said second set of matching points to obtain a new second set of triangles, after performing said step of removing matching status;

triangulating said third set of matching points to obtain a new third set of triangles, after performing said step of removing matching status; and making an initial identification of matching points in said second set of matching points and said third set of matching points that have potential for causing topology deviations in said first set of geometric objects, after performing said step of removing matching status.

25. The processor readable storage medium of claim 24, wherein said step (b) includes the steps of:

generating a set of transformation equations;

identifying a set of arc intersection points in said new second set of geometric objects; and performing a point transformation on points and arc intersection points in said second set of geometric objects using said set of transformation equations to obtain points for said first set of geometric objects.

26. The processor readable storage medium of claim 25, wherein said set of transformation equations includes transformation equations for each corresponding pair of triangles in said new second set of triangles and said new third set of triangles.

27. The processor readable storage medium of claim 25, wherein said step (b) further includes the step of:

making arc connections between said points for said first set of geometric objects.

28. The processor readable storage medium of claim 15, wherein said second set of geometric objects represents a physical area and said third set of geometric objects represents said physical area.

29. An apparatus for forming a first set of geometric objects, based on a second set of geometric objects and a third set of geometric objects, wherein said second set of geometric objects contains a second set of matching points and said third set of geometric objects contains a third set of matching points, wherein each matching point in said second set of matching points corresponds to a matching point in said third set of matching points, said apparatus comprising:

a processor; and a processor readable storage medium, in communication with said processor, said processor readable storage medium storing code for programming said processor to perform the steps of:

(a) identifying matching points in said second set of matching points and corresponding matching points in said third set of matching points that have potential for causing topology deviations in the first set of geometric objects; and (b) transforming points in said second set of geometric objects to obtain points in said first set of geometric objects, based on relationships between corresponding matching points in said second set of matching points and said third set of matching points other than said matching points identified in said step (a).

30. The apparatus of claim 29, wherein said step (a) includes the steps of:

triangulating said second set of matching points to obtain a second set of triangles;

triangulating said third set of matching points to obtain a third set of triangles; and making an initial identification of matching points in said second set of matching points and said third set of matching points that have potential for causing topology deviations in said first set of geometric objects.

31. The apparatus of claim 30, wherein said step of making an initial identification includes the steps of:

selecting a pair of triangles, wherein said pair includes a second triangle in said second set of triangles and a third triangle that is in said third set of triangles and corresponds to said second triangle; and analyzing said pair of triangles to determine whether vertices of triangles in said pair are matching points that have potential for causing topology deviations in the first set of geometric objects.

32. The apparatus of claim 31, wherein said step of analyzing includes the step of:

determining whether said second triangle and said third triangle are inverted.

33. The apparatus of claim 31, wherein said step of analyzing includes the step of:

determining whether either of said second triangle and said third triangle have acceptable dimensions.

34. The apparatus of claim 33, wherein said step of determining whether either of said second triangle and said third triangle have acceptable dimensions, includes the step of:

determining whether either said second triangle or said third triangle has an area less than a minimum acceptable area.

35. The apparatus of claim 33, wherein said step of determining whether either of said second triangle and said third triangle have acceptable dimensions, includes the step of:

determining whether either said second triangle or said third triangle has a height less than a minimum acceptable height.

36. The apparatus of claim 30, wherein said step (a) further includes the step of:

removing matching status of a set of matching points identified in said step of making an initial identification.

37. The apparatus of claim 36, wherein said step (a) further includes the step of:

replacing a point that had matching status removed in said step of removing matching status.

38. The apparatus of claim 36, wherein said step (a) further includes the steps of:

triangulating said second set of matching points to obtain a new second set of triangles, after performing said step of removing matching status;

triangulating said third set of matching points to obtain a new third set of triangles, after performing said step of removing matching status; and making an initial identification of matching points in said second set of matching points and said third set of matching points that have potential for causing topology deviations in said first set of geometric objects, after performing said step of removing matching status.

39. The apparatus of claim 38, wherein said step (b) includes the steps of:

generating a set of transformation equations;

identifying a set of arc intersection points in said new second set of geometric objects; and performing a point transformation on points and arc intersection points in said second set of geometric objects using said set of transformation equations to obtain points for said first set of geometric objects.

40. The apparatus of claim 39, wherein said set of transformation equations includes transformation equations for each corresponding pair of triangles in said new second set of triangles and said new third set of triangles.

41. The apparatus of claim 39, wherein said step (b) further includes the step of:

making arc connections between said points for said first set of geometric objects.

42. The apparatus of claim 29, wherein said second set of geometric objects represents a physical area and said third set of geometric objects represents said physical area.

* * * * *